United States Patent
Neulander et al.

(10) Patent No.: US 11,164,367 B2
(45) Date of Patent: Nov. 2, 2021

(54) ILLUMINATION EFFECTS FROM LUMINOUS INSERTED CONTENT

(71) Applicant: Google LLC, Mountain View, CA (US)

(72) Inventors: Ivan Neulander, Los Angeles, CA (US); Mark Dochtermann, Mountain View, CA (US)

(73) Assignee: Google LLC, Mountain View, CA (US)

( * ) Notice: Subject to any disclaimer, the term of this patent is extended or adjusted under 35 U.S.C. 154(b) by 34 days.

(21) Appl. No.: 16/514,387

(22) Filed: Jul. 17, 2019

(65) Prior Publication Data

US 2021/0019935 A1 Jan. 21, 2021

(51) Int. Cl.
| | |
|---|---|
| *G06T 15/50* | (2011.01) |
| *G06T 13/20* | (2011.01) |
| *G06T 19/00* | (2011.01) |
| *G06T 19/20* | (2011.01) |

(52) U.S. Cl.
CPC .......... *G06T 15/506* (2013.01); *G06T 13/20* (2013.01); *G06T 19/006* (2013.01); *G06T 19/20* (2013.01)

(58) Field of Classification Search
CPC .......... G06F 2200/1637; G06F 1/1694; G06F 3/017; G06F 3/0346; G06F 3/04815; G06F 3/04842; H04N 21/4725; H04N 21/23412; H04N 21/4314; H04N 21/4333; H04N 21/440245; H04N 21/47205;

(Continued)

(56) References Cited

U.S. PATENT DOCUMENTS

| 8,941,580 B2* | 1/2015 | Li ........................ G09G 3/3611 345/102 |
| 2013/0044958 A1* | 2/2013 | Brandt ............... G06K 9/00248 382/201 |
| 2017/0078596 A1* | 3/2017 | Chesnokov ............ H04N 9/646 |

(Continued)

OTHER PUBLICATIONS

Ultimate Guide: Building a Mask R-CNN Model for Detecting Car Damage (with Python codes), Jul. 19, 2018, Author Priya Dwivedi https://www.analyticsvidhya.com/blog/2018/07/building-mask-r-cnn-model-detecting-damage-cars-python/ (Year: 2018).*

(Continued)

*Primary Examiner* — Ming Wu
(74) *Attorney, Agent, or Firm* — Brake Hughes Bellermann LLP

(57) ABSTRACT

Systems and methods for generating illumination effects for inserted luminous content, which may include augmented reality content that appears to emit light and is inserted into an image of a physical space. The content may include a polygonal mesh, which may be defined in part by a skeleton that has multiple joints. Examples may include generating a bounding box on a surface plane for the inserted content, determining an illumination center point location on the surface plane based on the content, generating an illumination entity based on the bounding box and the illumination center point location, and rendering the illumination entity using illumination values determined based on the illumination center point location. Examples may also include determining illumination contributions values for some of the joints, combining the illumination contribution values to generate illumination values for pixels, and rendering another illumination entity using the illumination values.

17 Claims, 12 Drawing Sheets

(58) Field of Classification Search
CPC .......... H04N 21/4728; H04N 21/8545; H04N 21/8583; A63F 13/5258
See application file for complete search history.

(56) References Cited

U.S. PATENT DOCUMENTS

| | | |
|---|---|---|
| 2017/0228867 A1* | 8/2017 | Baruch .............. G06K 9/00362 |
| 2018/0183986 A1 | 6/2018 | Smith et al. |
| 2019/0102934 A1 | 4/2019 | Neulander |
| 2019/0102935 A1 | 4/2019 | Neulander |
| 2019/0114828 A1 | 4/2019 | Trowbridge |

OTHER PUBLICATIONS

NPL: Ultimate Guide: Building a Mask R-CNN Model for Detecting Car Damage (with Python codes), Jul. 19, 2018, Author Priya Dwivedi https://www.analyticsvidhya.com/blog/2018/07/building-mask-r-cnn-model-detecting-damage-cars-python/ (Year: 2018).*

Buades, et al., "A non-local algorithm for image denoising", IEEE Computer Society Conference on Computer Vision and Pattern Recognition (CVPR '05), vol. 2, doi: 10.1109/CVPR.2005.38., 2005, pp. 60-65.

Extended European Search Report for European Application No. 20185263.9, dated Sep. 30, 2020, 9 pages.

* cited by examiner

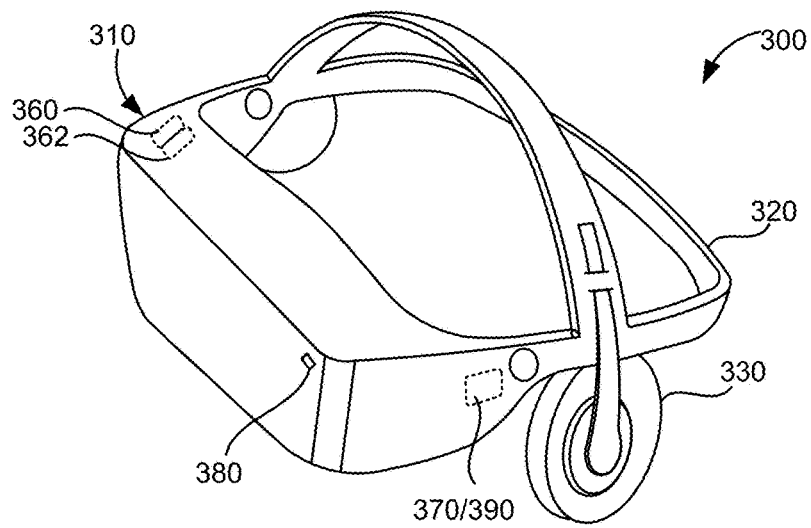
FIG. 3A
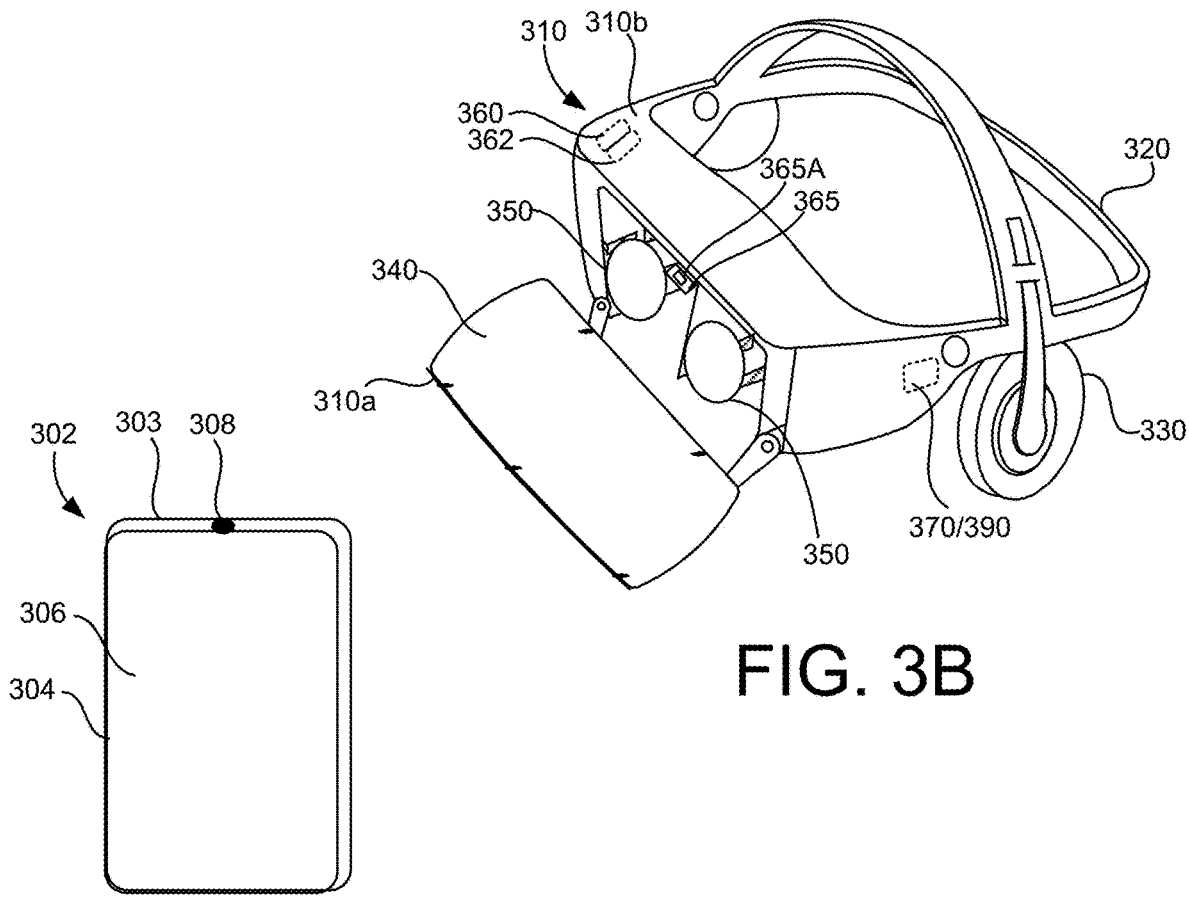
FIG. 3B
FIG. 3C

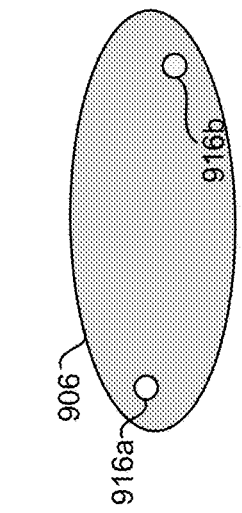
FIG. 9G
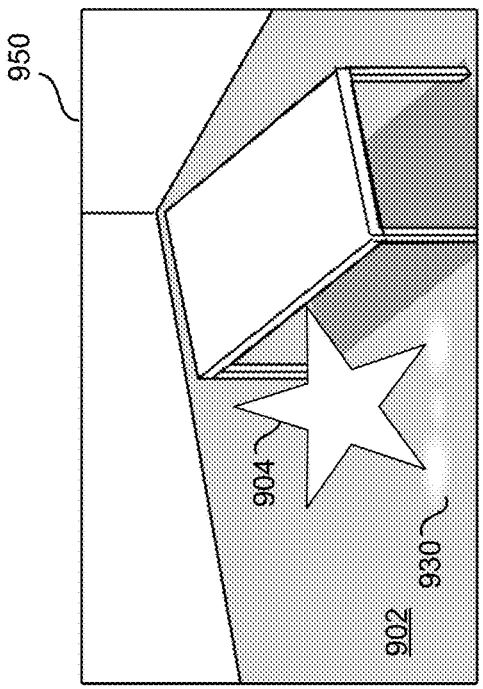
FIG. 9I
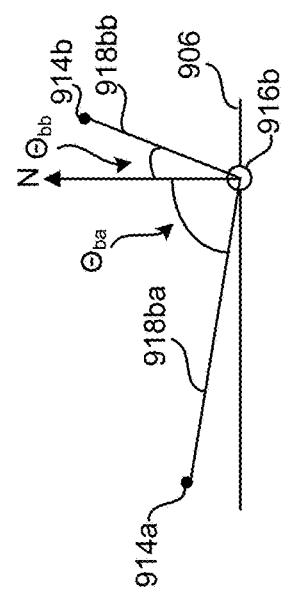
FIG. 9E
FIG. 9F
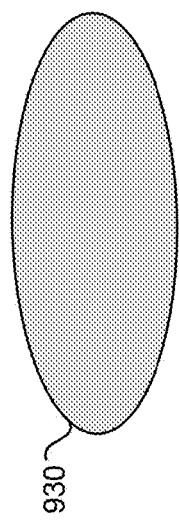
FIG. 9H

ILLUMINATION EFFECTS FROM LUMINOUS INSERTED CONTENT

BACKGROUND

Content may be inserted into an image or a user's field of view. For example, an augmented reality (AR) system may generate an immersive augmented environment for a user by inserting content. The immersive augmented environment can be generated by superimposing computer-generated content on a user's field of view of the real world. For example, the computer-generated content can include labels, textual information, images, sprites, and three-dimensional entities. These images may be displayed at a position in the user's field of view so as to appear to overlay an object in the real world. Similarly, the computer-generated content may be overlaid on a displayed image. The inserted content may be light-distributing content such as luminous content that emits light (or visually appears to emit light), which may illuminate portions of the displayed image.

SUMMARY

This disclosure describes systems and methods for generating illumination effects from luminous inserted content. For example, the inserted content may include augmented reality content that is inserted into an image of a physical space.

One aspect is a method that includes determining a location within an image to insert content; generating a bounding box on a surface plane for the inserted content; determining an illumination center point location on the surface plane based on the content; generating an illumination entity based on the bounding box and the illumination center point location; and rendering the illumination entity using illumination values determined at least in part based on the illumination center point location.

Another aspect is a non-transitory computer-readable storage medium comprising instructions stored thereon that, when executed by at least one processor, are configured to cause a computing system to at least: determine a location within an image to insert content, the content including a skeletal animation model; identify a surface plane based on the image; generate a bounding box on the surface plane based on a plurality of skeletal joints from the skeletal animation model; determine an illumination center point location on the surface plane based on the plurality of joints; generate an illumination entity based on the bounding box and the illumination center point location; and render the illumination entity using pixel values determined at least in part based on the illumination center point location.

Yet another aspect is a system that includes: a camera assembly; at least one processor; and memory storing instructions that, when executed by the at least one processor, cause the system to: capture an image with the camera assembly; identify a surface plane based on the image; determine a location to insert first content that includes a polygonal mesh defined in part by a skeleton that has a plurality of joints; generate a bounding box on the surface plane for the first content based on the plurality of joints; determine a center of mass location of the first content based on projecting the plurality of joints on the surface plane; generate a first illumination entity on the surface plane based on the bounding box and the center of mass location; render the first illumination entity using illumination values that are based on applying a radial falloff function to the center of mass location; and overlay the first content on the image.

The details of one or more implementations are set forth in the accompanying drawings and the description below. Other features will be apparent from the description and drawings, and from the claims.

BRIEF DESCRIPTION OF THE DRAWINGS

FIGS. 3A, 3B, and 3C are diagrams depicting an example head-mounted display device and controller, in accordance with implementations as described herein.

FIGS. 9A-9I are schematic diagrams of steps of generating illumination effects for inserted content in accordance with implementations as described herein.

DETAILED DESCRIPTION

Figure 1:
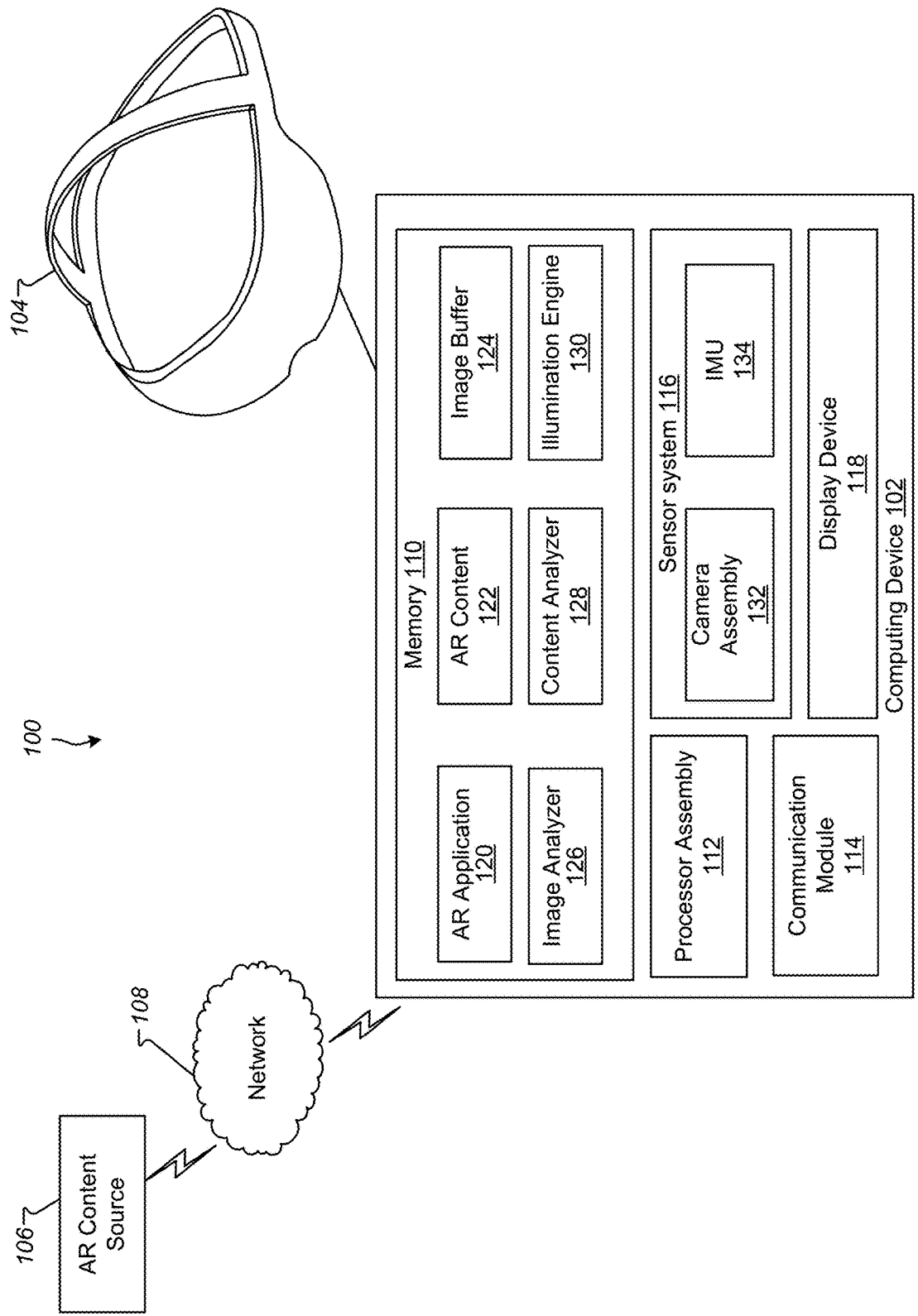
FIG. 1 is a block diagram illustrating a system according to an example implementation.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

Augmented reality (AR) systems include systems that insert computer-generated content into a user's perception of the physical space surrounding the user. The computer-generated content may include labels, textual information, images, sprites, and three-dimensional entities. In some implementations, the content is inserted for entertainment, educational, or informational purposes. The inserted content may include light-distributing content such as luminous content or reflective content. As used herein, the term light-distributing content means inserted content that distributes light into the surrounding environment. For example, the distributed light may be emitted by the content or reflected by the content. Non-limiting examples of light-distributing content include luminous content and reflective content. As used herein, the term luminous content refers to content that emits light. As used herein, the term reflective content means content that reflects light. The light distributed by the light-distributing content may alter the appearance of the physical space (real-world environment) surrounding the user when viewed through an AR system.

An example AR system is a portable electronic device, such as a smartphone, that includes a camera and a display device. The portable electronic device may capture images using the camera and show AR images on the display device that include computer-generated content overlaid upon the images captured by the camera.

Another example AR system includes a head-mounted display (HMD) that is worn by a user. The HMD includes a display device that is positioned in front of a user's eyes. For example, the HMD may occlude the user's entire field of view so that the user can only see the content displayed by the display device. In some examples, the display device is configured to display two different images, one that is viewable by each of the user's eyes. For example, at least some of the content in one of the images may be slightly offset relative to the same content in the other image so as to generate the perception of a three-dimensional scene due to parallax. In some implementations, the HMD includes a chamber in which a portable electronic device, such as a smartphone, may be placed so as to permit viewing of the display device of the portable electronic device through the HMD.

Another example AR system includes an HMD that permits the user to see the physical space while the HMD is being worn. The HMD may include a micro-display device that displays computer-generated content that is overlaid on the user's field of view. For example, the HMD may include an at least partially transparent visor that includes a combiner that permits light from the physical space to reach the user's eye while also reflecting images displayed by the micro-display device toward the user's eye.

When computer-generated, light-distributing content such as luminous content is inserted into an image, illumination effects may be generated around, below, or above the content so that the content appears more realistic. For example, the image surrounding the inserted content may be modified as though the environment were actually being lit by the light-distributing content. At least some of the implementations described herein solve technical problems related to illuminating the image feed surrounding the inserted light-distributing content. For example, a technical problem is that the resulting illumination effects may reduce contrast in the surrounding image or amplify noise. Some of the technical solutions described herein relate to scaling the brightness of illumination effects inversely to the brightness of the underlying image pixels so as to maintain contrast and prevent causing areas of the image to appear overexposed and spatially or temporally filtering input image data used to generate illumination effects.

AR systems may need to refresh images displayed to a user in real time at a high frame rate, such as 24 frames per second (FPS), 30 FPS, 60 FPS, or another rate. The techniques described herein allow for generating illumination effects for inserted content in a realistic manner. In some implementations, the illumination effects may be generated in a manner that allows for maintaining a high frame rate. The techniques may also be computational efficient, such that they do not require many processing cycles. Additionally, due to the reduced number of processing cycles required by the techniques described herein, these techniques may allow for inserting content into a captured image/video in a realistic manner while minimizing power usage. This reduction in power required to insert illumination effects may be particularly important in AR systems that include battery-operated mobile devices.

An example AR system captures images of the physical space surrounding a user. The system may then identify a surface plane, such as the ground or a floor, in the image and determine a location to insert content. For example, the system may receive a user input indicating a location on the screen for the content. The content may be placed at the location indicated by the user or at a location on the identified surface plane that is below the location indicated by the user. The content may, for example, include a three-dimensional model, such as a polygonal mesh model or a skeletal animation model. A skeletal animation model may include a polygonal mesh and a set of connected skeletal joints (which may be referred to as a skeleton or a rig) that is used to animate and position the mesh. The skeletal joints may be represented as three-dimensional coordinates. In some implementations, the three-dimensional coordinates are defined with respect to a common origin of the skeletal animation model. The skeletal animation model may also store connection data that define segments that connect the joints. These segments may be analogous to bones of a skeleton. The segments connecting the joints may move or rotate about at least some of the joints. These movements may result in corresponding changes in the outer surface mesh of the skeletal animation model. As the segments move or rotate, connected joints and segments may also move or rotate. In some implementations, the joints (e.g., skeletal joints) can be an approximation of joints of a skeletal animation model. In some implementations, one or more joints can be at, or can include, an intersection of longitudinal members of content (e.g., an object). In some implementations, a skeleton can be, or can be referred to as a frame.

Next, the system may generate a bounding box and an illumination center point (e.g., an illumination middle point) on the surface plane based on the content. In some implementations, the illumination center point is the location at which maximum irradiance is inferred on the plane, producing the brightest illumination, which may decay radially around the illumination center point. For example, the bounding box may be a rectangular shape on the surface planes that circumscribes the content. In some implementations, the bounding box may circumscribe a polygonal mesh (or a projection of the polygonal mesh onto the plane) of the content. In some implementations, the bounding box may circumscribe all of the joints of a skeletal animation model associated with the content (or a projection of the joints onto the plane).

The illumination center point may be a center of mass of the inserted content. In some implementations, the center of mass may be determined based on the volume contained within a polygonal mesh (e.g., the entire volume may be treated as having the same density to determine its center of mass). In some implementations, the center of mass may be calculated by averaging the positions of the joints (or the positions of the joints after they have been projected onto the surface plane). In some implementations, the center of mass can be an approximate center of mass. The joints may be weighted equally or may be weighted based on other factors such as distance from the surface plane. In some implementations, not all of the joints are used to generate a bounding box and illumination center point. For example, in some implementations, the inserted content may identify a subset of joints that are to be used in generating the bounding box and illumination center point (i.e., a joint whitelist). In some implementations, the inserted content may identify a subset of joints that are to be excluded when generating the bounding box and illumination center point (i.e., a joint blacklist). For example, the inserted content may be associated with a data structure that includes a joint blacklist or joint whitelist. Each of the skeletal joints of the inserted content may include a Boolean value that indicates whether the joint should be used to generate illumination effects (e.g., in generating the bounding box and illumination center point).

Based on the bounding box and the illumination center point, an illumination polygon may be generated on the surface plane. The illumination polygon may have various shapes. For example, the illumination polygon may have a round shape, such as a circle, ellipse, or oval, that fits within the bounding box and includes a first and second axis that intersect at the illumination center point. Although much of the description is related to an oval-shaped illumination polygon, the illumination polygon can be any shape. Some implementations may not include illumination polygons. In these implementations, a region of the image may be identified based on the bounding box and the illumination center point and illumination values may be calculated for the pixels within the region in a manner similar to that described herein for the pixels of the illumination polygon.

Illumination values for the pixels of the illumination polygon may be calculated based on the light-distributed by the inserted content. For example, light-emitting content may emit light of a specific tint (e.g., the light may be associated with a color value such as a red green blue (RGB) value). The intensity (e.g., brightness) of the emitted light on the illumination polygon may attenuate gradually based on distance from the illumination center point. For example, the pixels at or near the illumination center point may be shaded most brightly based on the specific tint of the light-emitting content while pixels further from the illumination center point may be shaded less brightly. In some implementations, the illumination polygon is shaded such that the brightness of the pixels falls of gradually between the illumination center point and the edge of the illumination polygon. For example, in some implementations, the brightness falls of linearly (e.g., a pixel located halfway between the illumination center point and the edge of the illumination polygon is half as bright as a pixel at the illumination center point). The illumination values may, for example, be represented as a vector of three numeric values between 0 and 1, with each of the numeric values representing an intensity of one of red, green, and blue illumination).

In some implementations, the shading of the pixels of the illumination polygon are also impacted by the brightness of a corresponding pixel in the image feed. For example, the pixels of the illumination polygon may be shaded based on the shade of light emitted by the light-emitting content, the fall-off based on position with respect to the illumination center point and the edge of the illumination polygon, and a brightness value determined for a corresponding pixel in the image feed. The brightness value may be determined from a single corresponding pixel or from a region surrounding the pixel. In some implementations, the brightness value is determined from a spatially or temporally denoised image. The brightness value may be used to scale the illumination effect. For example, the illumination effect may be scaled inversely based on the brightness value. This scaling may prevent reducing contrast in bright areas and causing the resulting image to appear overexposed. Additionally, the scaling may result in more realistic illumination effects.

In some implementations, the pixel values of the illumination polygon may then be applied multiplicatively to the underlying pixel values of the image. In implementations that represent colors using RGB colors, for example, a lighted pixel value L (having a red component $L_R$, a blue component $L_B$, and a green component $L_G$), may be calculated by multiplying an illumination pixel value IL (having a red component $IL_R$, a blue component $IL_B$, and a green component $IL_G$) by an underlying image pixel value IM (having a red component $IM_R$, a blue component $IM_B$, and a green component $IM_G$). In some implementations, the RGB components of the lighted pixel value is calculated using the following formulas:

$$L_R=(1+IL_R)*IM_R;$$

$$L_G=(1+IL_G)*IM_G;\text{ and}$$

$$L_B=(1+IL_B)*IM_B.$$

In some implementations, multiple values are calculated for each pixel. The color of pixels in the underlying image may be based on the color of light in the real-world environment and the color albedo of the real-world surfaces captured in the image. For example, a pixel in an image of the real-world may have a red tint because it represents a portion of a red object or because it represents a white object that is illuminated with red light. The effect of emitting white light on such an object will be quite different depending on whether the object is red or white. In some implementations, two lighted pixel values are calculated. A first lighted pixel value is calculated using the original pixel value of the underlying image as described above. This first lighted pixel value corresponds to the illumination effect assuming the color of the pixel in the image is primarily based on the color of the underlying real-world surface or object. The second lighted pixel value may be calculated by multiplicatively applying the illumination value to a luma value calculated for the pixel of the image. The luma value corresponds to the brightness of the pixel without regard to hue (color or tint). This second lighted pixel value corresponds to the illumination effect assuming the color of the pixel in the image is primarily based on the color of environmental light shining on a real-world surface or object. The first lighted pixel value and the second lighted pixel value may be combined using a weighting value. The weighting value may be 0.5 such that the first lighted pixel value and the second lighted pixel value are equally weighted. The weighting value may be set based on a value associated with the inserted content. The weighting value may also be set based on determining or inferring an environment (e.g., indoor or outdoor) or surface type. The weighting value may also be set based on user input.

It is possible that a pixel of an illumination polygon (or the corresponding pixels of the underlying image) will be impacted by light distributed from additional inserted contents. In at least some implementation, the illumination values for the pixel is calculated for each inserted content and then the illumination values are combined. For example, the illumination values may be summed. Beneficially, by combining the illumination values before applying the illumination values to the underlying pixels, these implementations may avoid (or reduce the likelihood) of oversaturating a region of the image by repeatedly multiplicatively applying illumination values.

In some implementations, the illumination polygon may also be shaded with a transparency value (e.g., an alpha value) that increases with distance from the illumination center point (i.e., the illumination polygon becomes more transparent and, therefore, less visible further from the illumination center point). In some examples, the transparency value increases non-linearly based on distance from the illumination center point. The illumination polygon can then be placed behind the content to be inserted as a first illumination entity. Some implementations do not use a transparency value. In these implementations, the illumination polygon may be shaded to smoothly fade into the underlying image (e.g., because the pixel values of the illumination polygon are determined based on the underlying pixel values of the image and at the edges of the illumination polygon the illumination effect fades away).

Although the examples described herein generally relate to an illumination polygon positioned on a surface below inserted content, some implementations include illumination polygons in additional or different positions. For example, some implementations include an illumination polygon disposed behind (with respect to the viewing position) the inserted content. Placing an illumination polygon behind the inserted content may result illumination effects on walls, surfaces, or other content of the image disposed behind the inserted content. Similarly, illumination polygons may be positioned on either side of the inserted content. In some implementations, surfaces may be identified in the real-world environment surrounding the inserted content and illumination polygons may be positioned on any surfaces within a threshold distance of the inserted content. The surfaces may be identified based on one or more images of the real-world environment.

In some implementations, a second illumination entity can be generated for the content to be inserted. The first illumination entity, which is described above, may generate a single illumination effect that has a radial falloff from the determined location of the illumination center point. This second illumination entity may have a non-uniform shape based on the joints of a skeletal animation model. Some implementations include the first illumination entity, some implementations include the second illumination entity, and some implementations include both the first illumination entity and the second illumination entity.

To generate the second illumination entity, some implementations generate a second illumination polygon on the surface plane below the location of the content to be inserted. For example, the second illumination polygon may be a rectangle having the same shape as a bounding box of the joints of the skeletal animation model (or a selected subset of joints). The second illumination polygon may comprise a polygon with sixteen or another number of sides, such as eight, ten, twelve, fourteen, fifteen, seventeen, or eighteen sides. Other numbers of sides are possible as well. In some implementations, the sides of the polygon approximate an oval that fits in the bounding box. Similar to as described previously, other illumination polygons that are shaded similarly to the second illumination polygon may be disposed at other locations such as behind or to the side of the inserted content, or on surfaces identified in the real-world environment.

Next, a selection of the content may be identified. In some implementations, the selection includes all of the content or a portion of the content. For example, the selection of the content may include 25% of the joints in the skeletal animation model associated with the content. The 25% may be selected as the lowest 25% of the joints (i.e., the 25% of the joints having the lowest positional value along a vertical dimension) or as the 25% of the joints that are closest to the surface plane. In some implementations, a different threshold value is used to select joints instead of 25%. For example, in some implementations, the threshold may be 10%, 20%, 30%, 33%, 40%, 50%, or another value. The selection may also be based on a number of joints to be selected, such as 10, 20, 50, 100, or another number of joints. In some implementations, the joints in the selection may be assigned a fade-out factor. The fade-out factor is higher for joints that were close to not being selected. For example, if 25% of joints are selected based on distance to the surface plane, the selected joints that are furthest from the surface plane may have the highest fade-out value. The fade-out value may limit some of the joints' contribution to an illumination effect so as to prevent popping artifacts that may occur as joints move in and out of the selection during sequential frames. The selection of joints may also be based on values stored in a data structure associated with the inserted content. For example, the data structure may identify some joints to exclude from use in generating illumination effects. In this case, a threshold percentage or number of joints may be identified from the non-excluded joints.

The joints may be assigned a radius value, which may be used to calculate an illumination contribution for the joint. In some implementations, all of the selected joints are assigned the same radius value. Alternatively, the joints may have different radius values that correspond to properties of the model (e.g., the joints that are farthest from other joints may have a larger radius than other joints). For example, the joints having larger radius values may contribute more to a generated illumination effect. In some implementations, the radius values of some joints are set to zero so as to exclude those joints from contributing to illumination effects.

An illumination value may then be calculated for each pixel of the second illumination polygon. For example, the illumination value may be calculated during rendering. The illumination value may be calculated by summing illumination contributions from each of the joints in the selection. In other implementations, the illumination value is selected by averaging or summing the illumination contributions of the selected joints.

For each joint, the illumination contribution to a particular pixel may be based on multiple factors, such as a distance factor and an angle of elevation factor. For example, the illumination contribution may be determined by combining the distance factor and the angle of elevation factor. In some implementations, the distance factor corresponds to the geometric solid angle of the joint with respect to the pixel (i.e., corresponding to the space subtended by the joint). In some implementations, the solid angle is calculated as a value that is proportional to the arctangent of the quotient of the radius of the joint divided by the distance to the joint. In some implementations, the distance factor approximates the solid angle and is calculated as the quotient of the radius of the joint divided by the sum of the radius of the joint plus the distance to the joint from the pixel's location in the scene. This approximation of the solid angle may require less processor cycles than calculating the solid angle using the arctangent function. In some implementations, the angle of elevation factor is based on the projection of the vector from the pixel to the joint and the normal vector of the second illumination polygon. For example, in some implementations, the angle of elevation factor is calculated using the following formula:

$$f * \text{dot}(N, V) * r^2 / (r^2 + d^2) \text{ where:}$$

N is the surface normal of the surface plane;
V is the unit vector from the pixel to the joint;
r is the radius of the joint;
d is the distance from the pixel to the joint; and
f is the fade-out value for the joint.

Once the illumination values are calculated for each pixel, a gamma function may be applied to normalize the illumination values. For example, the gamma function may remap the illumination values to normalized values that accentuate the midtones without having excessively bright regions that reduce contrast or wash out the underlying image content. Additionally, a smooth radial falloff may be applied to the second illumination polygon to eliminate hard illumination effect edges at the polygon border. The smooth radial falloff may be applied in a manner similar to that described for the first illumination polygon.

These illumination values may also be scaled based on the underlying brightness of the image pixels (e.g., scaled inversely to the brightness). Then, these illumination values may used to calculate lighted pixel values like the illumination pixel values were used in the example of the first illumination polygon. In some implementations, if a pixel is impacted by both the first illumination polygon and the second illumination polygon (e.g., if a first illumination entity and a second illumination entity overlap), the illumination effects of the two are additively combined.

The inserted content and one or more generated illumination entities may then be presented to the user (e.g., overlaid on a captured image of the physical space surrounding the user, projected/displayed on an optical combiner disposed within the user's field of view, etc.). In some implementations, the first and second illumination entities described above are blended together or otherwise combined. For example, polygons corresponding to the first and second illumination entities may be combined during rendering each pixel by selecting and using the lower transparency value from the first or second illumination entity for each pixel or by combining the values in another way. Although many examples herein refer to transparency values (or alpha values), other implementations are possible as well. For example, some implementations calculate an illumination strength rather than a transparency value. The illumination strength would be proportional to the opacity of the illumination entities that are described in terms of transparency/alpha values (e.g., the illumination strength would be highest when the transparency of the illumination entity/polygon is lowest, and the illumination strength would be lowest when the transparency of the illumination entity/polygon is highest). In these implementations, rather than overlaying a partially transparent bright colored polygon over the image, the illumination strength is used to alter the image. For example, the value of a pixel may be multiplied by the one plus the illumination strength (or one plus the illumination strength times the illumination properties of the inserted content (e.g., tint and intensity)), where the illumination strength has a value between zero and one. In this manner, the pixel value gets brighter as the illumination strength increases. In some implementations, a pixel value can include a color of a pixel.

Although many examples described herein relate to AR systems inserting visual content into an AR environment, content may be inserted using the techniques described herein in other systems too. For example, the techniques described herein may be used to insert content into an image or video.

FIG. 1 is a block diagram illustrating a system 100 according to an example implementation. The system 100 generates an augmented reality (AR) environment for a user of the system 100. In some implementations, the system 100 includes a computing device 102, a head-mounted display device (HMD) 104, and an AR content source 106. Also shown is a network 108 over which the computing device 102 may communicate with the AR content source 106.

The computing device 102 may include a memory 110, a processor assembly 112, a communication module 114, a sensor system 116, and a display device 118. The memory 110 may include an AR application 120, AR content 122, an image buffer 124, an image analyzer 126, a content analyzer 128, and an illumination engine 130. The computing device 102 may also include various user input components (not shown) such as a controller that communicates with the computing device 102 using a wireless communications protocol. In some implementations, the computing device 102 is a mobile device (e.g., a smart phone) which may be configured to provide or output AR content to a user via the HMD 104. For example, the computing device 102 and the HMD 104 may communicate via a wired connection (e.g., a Universal Serial Bus (USB) cable) or via a wireless communication protocol (e.g., any WiFi protocol, any BlueTooth protocol, Zigbee, etc.). In some implementations, the computing device 102 is a component of the HMD 104 and may be contained within a housing of the HMD 104.

The memory 110 can include one or more non-transitory computer-readable storage media. The memory 110 may store instructions and data that are usable to generate an AR environment for a user.

The processor assembly 112 includes one or more devices that are capable of executing instructions, such as instructions stored by the memory 110, to perform various tasks associated with generating an AR environment. For example, the processor assembly 112 may include a central processing unit (CPU) and/or a graphics processor unit (GPU). For example, if a GPU is present, some image/video rendering tasks, such as generating illumination effects or shading polygons representing illumination effects, may be offloaded from the CPU to the GPU.

The communication module 114 includes one or more devices for communicating with other computing devices, such as the AR content source 106. The communication module 114 may communicate via wireless or wired networks, such as the network 108.

The sensor system 116 may include various sensors, such as a camera assembly 132. Implementations of the sensor system 116 may also include other sensors, including, for example, an inertial motion unit (IMU) 134, a light sensor, an audio sensor, an image sensor, a distance and/or proximity sensor, a contact sensor such as a capacitive sensor, a timer, and/or other sensors and/or different combinations of sensors.

The IMU 134 detects motion, movement, and/or acceleration of the computing device 102 and/or the HMD 104. The IMU 134 may include various different types of sensors such as, for example, an accelerometer, a gyroscope, a magnetometer, and other such sensors. A position and orientation of the HMD 104 may be detected and tracked based on data provided by the sensors included in the IMU 134. The detected position and orientation of the HMD 104 may allow the system to detect and track the user's gaze direction and head movement.

In some implementations, the AR application may use the sensor system 116 to determine a location and orientation of a user within a physical space and/or to recognize features or objects within the physical space.

The camera assembly 132 captures images and/or videos of the physical space around the computing device 102 (i.e., the real-world environment). The camera assembly 132 may include one or more cameras. The camera assembly 132 may also include an infrared camera.

The AR application 120 may present or provide the AR content to a user via the HMD and/or one or more output devices of the computing device 102 such as the display device 118, speakers, and/or other output devices. In some implementations, the AR application 120 includes instructions stored in the memory 110 that, when executed by the processor assembly 112, cause the processor assembly 112 to perform the operations described herein. For example, the AR application 120 may generate and present an AR environment to the user based on, for example, AR content, such as the AR content 122 and/or AR content received from the AR content source 106. The AR content 122 may include content such as images or videos that may be displayed on a portion of the user's field of view in the HMD 104. The AR environment may also include at least a portion of the physical (real-world) environment and physical (real-world) entities. For example, illumination effects may be generated so that inserted AR content better fits the physical space in which the user is located. The content may include objects that overlay various portions of the physical space. The content may be rendered as flat images or as three-dimensional (3D) objects. The 3D objects may include one or more objects represented as polygonal meshes. The polygonal meshes may be associated with various surface textures, such as colors and images. The polygonal meshes may also be associated with skeleton for using in animation (e.g., the polygonal mesh may be a component of a skeletal animation model).

The AR application 120 may use the image buffer 124, image analyzer 126, content analyzer 128, and illumination engine 130 to generate images for display via the HMD 104 based on the AR content 122. For example, one or more images captured by the camera assembly 132 may be stored in the image buffer 124. In some implementations, the image buffer 124 is a region of the memory 110 that is configured to store one or more images. In some implementations, the computing device 102 stores images captured by the camera assembly 132 as a texture within the image buffer 124. Alternatively or additionally, the image buffer may also include a memory location that is integral with the processor assembly 112, such as dedicated random access memory (RAM) on a GPU.

The image analyzer 126 may determine various properties of the image, such as the location of a surface plane upon which the content may be positioned. In some implementations, the surface plane is a substantially horizontal plane that corresponds to the ground, a floor, or another surface upon which objects, such as the content to be inserted, could be placed.

The AR application 120 may determine a location to insert content. For example, the AR application may prompt a user to identify a location for inserting the content and may then receive a user input indicating a location on the screen for the content. The AR application may determine the location of the inserted content based on that user input. For example, the location for the content to be inserted may be the location indicated by the user. In some implementations, the location is determined by mapping the location indicated by the user to a plane corresponding to a surface such as a floor or the ground in the image (e.g., by finding a location on a plane identified by the image analyzer 126 that is below the location indicated by the user). The location may also be determined based on a location that was determined for the content in a previous image captured by the camera assembly (e.g., the AR application may cause the content to move across a surface that is identified within the physical space captured in the image).

The content analyzer 128 may then determine various properties of the content to be inserted at the determined location. For example, the content may be associated with a 3D model and skeletal animation model that includes joints. The skeletal animation model may be disposed within the 3D model and may allow for movement of portions of the 3D model around some or all of the joints. As an example, the content analyzer 128 may determine a bounding box and illumination center point on the surface plane based on the location of at least some of the joints of the skeletal animation model. For example, the skeletal joints may be projected onto the surface plane. In at least some embodiments, the joints are projected from an overhead position so as to generate illumination effects that appear to come from an overhead light source (e.g., by discarding the height component (i.e., the Y component when the surface is parallel to the X-Z plane) of the 3D position of the joints or setting the height component equal to the height of the plane). In some implementations, all of the joints are used to generate the bounding box and identify the illumination center point. In some implementations, a subset of the joints are used to generate the bounding box and identify the illumination center point (e.g., the inserted content may identify joints to use or exclude). In some implementations, the illumination center point may not be at a center of an object.

The bounding box may be a rectangle on the surface that contains all of the projected joints. In at least some implementations, the rectangle is aligned with the axes of the 3D coordinate system (e.g., if the surface is parallel to the X-Z plane, the sides of the rectangle are aligned with either the X or Z axes).

The illumination center point can be determined in various ways. For example, the illumination center point can be the spatial midpoint of the projected joints. The illumination center point can also be calculated as a center of mass of the projected joints (i.e., the average position of the projected joints). In some implementations, the joints may be assigned weights for purposes of calculating the center of mass. For example, the weights can be assigned based on distance from the surface (e.g., the joints that are closer to the surface have a higher weight than those that are further away).

The content analyzer 128 may also select a plurality of the joints to generate a plurality of selected joints. For example, the content analyzer 128 may select a predetermined percentage of the joints based on distance to the surface plane. In some implementations, the predetermined percentage is 25%, however, other predetermined percentages can be used too. Additionally or alternatively, a predetermined quantity of the joints can be selected. In some implementations, all of the joints are selected. A subset of joints may also be selected. In some implementations, a subset of the joints are selected based on a data structure associated with the inserted content. Beneficially, by selecting a subset of joints, the amount of processor cycles used to generate illumination effects may be reduced. The content analyzer 128 may also assign a fade-out value to the selected joints. For example, the fade-out value of a joint may be proportional to the distance between the joint and the surface plane. The content analyzer may also assign radius values to the selected joints. In some implementations, a same radius value is assigned to each of the selected joints. For example, the radius value may be determined based on the size of the content (e.g., the radius may be a predetermined percentage of the size of the content in one dimension, such as the longest dimension of the content). Additionally, different radius values may be assigned to the selected joints. In these implementations, the radius values may be based on distance from the selected joint to the next closest joint in the skeletal model.

The illumination engine 130 may generate one or more illumination effects for the content to be inserted. In some implementations, the illumination engine 130 generates a first illumination polygon based on the bounding box and illumination center point determined by the content analyzer 128. The first illumination polygon may have a light tint (e.g., white) and an illumination value that varies based on distance from the illumination center point. In some implementations, the illumination value is determined by applying a non-linear falloff based on distance from the center point. The non-linear falloff may cause the pixels near the center of the polygon to have higher illumination values than the pixels near the edges of the polygon. In at least some implementations, the pixels on the edge of the polygon have an illumination value of zero so as not to alter the appearance of the underlying image. In some implementations, the illumination value is inversely proportional to a transparency value (e.g., alpha value) for the polygon.

The illumination engine 130 may also generate a second illumination polygon that is shaded based, at least in part, on the selected joints. For example, each pixel of the second illumination polygon may be shaded according to an illumination value that is determined based on various properties of the pixel with respect to the selected joints. For example, an illumination contribution value may be calculated with respect to a particular pixel of the second illumination polygon and a particular selected joint. The illumination contribution value may be based on a distance and an overhead angle (also known as an elevation angle) of the particular selected joint relative to the particular pixel (i.e., a selected joint that is closer and/or more directly overhead a pixel makes a stronger illumination contribution than a selected joint that is more distance and/or less directly overhead). Additionally, the illumination contribution value may be reduced (or otherwise scaled) based on the fade-out value assigned to the selected joint (i.e., the selected joints with higher fade-out values will have lower illumination contribution values, all other things being equal, than selected joints with lower fade-out values).

The illumination engine 130 may then combine the illumination contributions from the selected joints to generate an illumination value for a specific pixel of the second illumination polygon. For example, the illumination contribution values may be combined by summing or averaging at least some of the illumination contributions values. In some implementations, the illumination contribution values may be combined by selecting a maximum value from the illumination contributions or averaging at least some of the illumination contributions values.

The illumination engine 130 may then combine the first illumination polygon and the second illumination polygon. The illumination values discussed with respect to the first illumination polygon and the illumination values discussed with respect to the second illumination polygon may be summed. In some implementations, the illumination engine 130 may also use other techniques to generate illumination effects. The illumination effects generated using other techniques may be combined with one or more of the first illumination polygon and the second illumination polygon. The illumination effects may also be combined with other lighting effects such as shadows. Although the examples herein relate to generating illumination effects for luminous content, some implementations of the illumination engine 130 also generate other lighting effects such as shadows. In some implementations, shadows are generated in a manner similar to the examples described herein for generating illumination effects.

In some implementations, the image analyzer 126, content analyzer 128, and illumination engine 130 may include instructions stored in the memory 110 that, when executed by the processor assembly 112, cause the processor assembly 112 to perform operations described herein to generate an image or series of images that are displayed to the user (e.g., via the HMD 104).

The AR application 120 may update the AR environment based on input received from the camera assembly 132, the IMU 134, and/or other components of the sensor system 116. For example, the IMU 134 may detect motion, movement, and/or acceleration of the computing device 102 and/or the HMD 104. The IMU 134 may include various different types of sensors such as, for example, an accelerometer, a gyroscope, a magnetometer, and other such sensors. A position and orientation of the HMD 104 may be detected and tracked based on data provided by the sensors included in the IMU 134. The detected position and orientation of the HMD 104 may allow the system to detect and track the user's position and orientation within a physical space. Based on the detected position and orientation, the AR application 120 may update the AR environment to reflect a changed orientation and/or position of the user within the environment.

Although the computing device 102 and the HMD 104 are shown as separate devices in FIG. 1, in some implementations, the computing device 102 may include the HMD 104. In some implementations, the computing device 102 communicates with the HMD 104 via a cable, as shown in FIG. 1. For example, the computing device 102 may transmit video signals and/or audio signals to the HMD 104 for display for the user, and the HMD 104 may transmit motion, position, and/or orientation information to the computing device 102.

The AR content source 106 may generate and output AR content, which may be distributed or sent to one or more computing devices, such as the computing device 102, via the network 108. In an example implementation, the AR content includes three-dimensional scenes and/or images. Additionally, the AR content may include audio/video signals that are streamed or distributed to one or more computing devices. The AR content may also include an AR application that runs on the computing device 102 to generate 3D scenes, audio signals, and/or video signals.

The network 108 may be the Internet, a local area network (LAN), a wireless local area network (WLAN), and/or any other network. A computing device 102, for example, may receive the audio/video signals, which may be provided as part of AR content in an illustrative example implementation, via the network.

Figure 2:
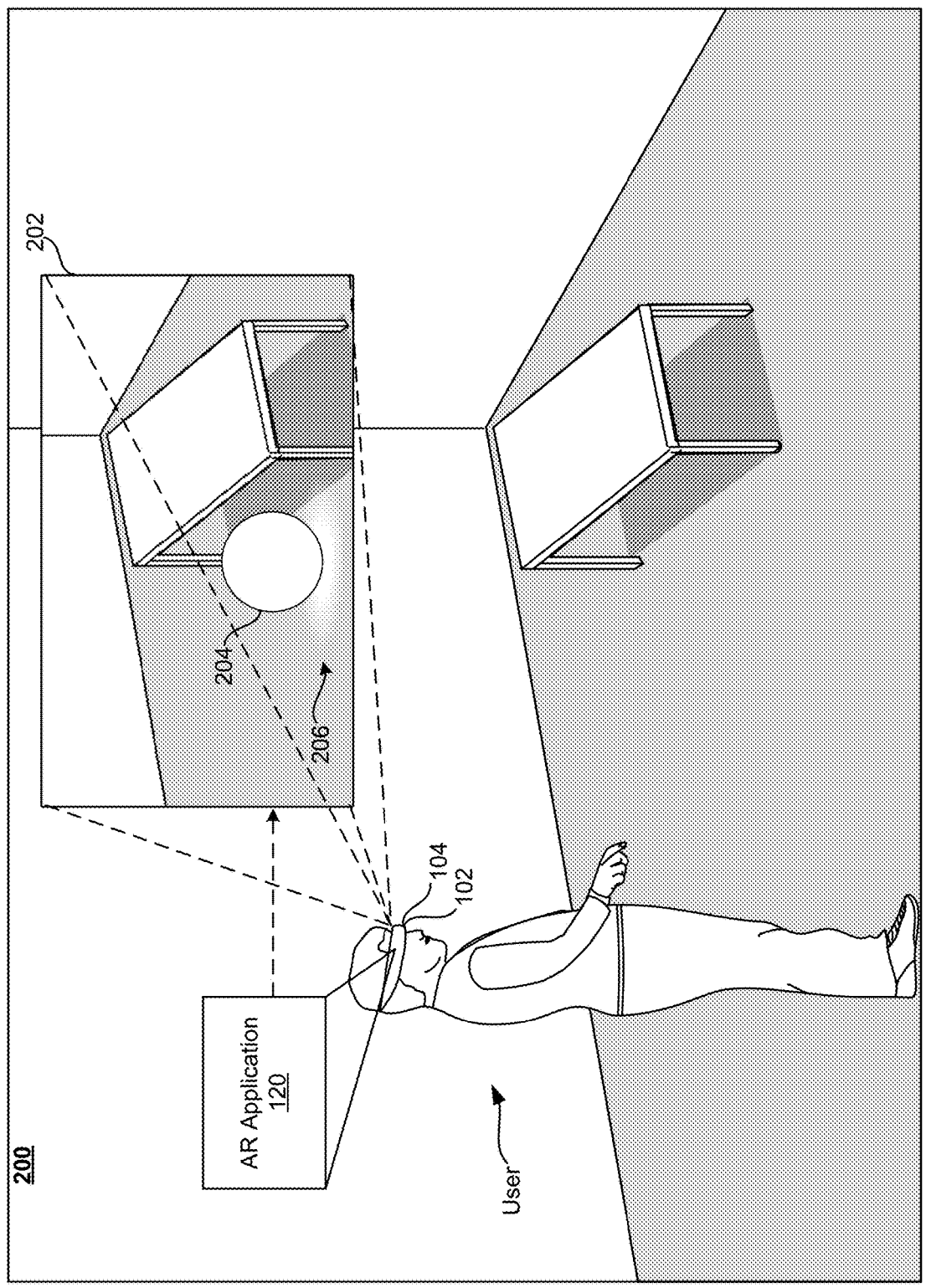
FIG. 2 is a third person view of an example physical space, in which a user is experiencing an AR environment through the example HMD of FIG. 1.

FIG. 2 is a third person view of an example physical space 200, in which a user is experiencing an AR environment 202 through the example HMD 104. The AR environment 202 is generated by the AR application 120 of the computing device 102 and displayed to the user through the HMD 104.

The AR environment 202 includes inserted content 204 that is displayed over an image of the physical space 200. In this example, the content 204 is a light-emitting sphere that is generating an illumination effect 206 on the representation of the floor in the AR environment 202. The illumination effect is generated in accordance with the techniques described herein.

In some implementations, the AR environment 202 is provided to the user as a single image or a pair of stereoscopic images that occupy substantially all of the user's field of view and are displayed to the user via the HMD 104. In other implementations, the AR environment is provided to the user by displaying/projecting the inserted content 204 and the generated illumination effect 206 on an at least partly transparent combiner that occupies at least a portion of the user's field of view. For example, portions of the HMD 104 may be transparent, and the user may be able to see the physical space 200 through those portions while the HMD 104 is being worn.

FIGS. 3A and 3B are perspective views of an example HMD 300, such as, for example, the HMD 104 worn by the user in FIG. 2, and FIG. 3C illustrates an example handheld electronic device 302 for controlling and/or interacting with the HMD 300.

The handheld electronic device 302 may include a housing 303 in which internal components of the device 302 are received, and a user interface 304 on an outside of the housing 303, accessible to the user. The user interface 304 may include a touch sensitive surface 306 configured to receive user touch inputs. The user interface 304 may also include other components for manipulation by the user such as, for example, actuation buttons, knobs, joysticks and the like. In some implementations, at least a portion of the user interface 304 may be configured as a touchscreen, with that portion of the user interface 304 being configured to display user interface items to the user, and also to receive touch inputs from the user on the touch sensitive surface 306. The handheld electronic device 302 may also include a light source 308 configured to selectively emit light, for example, a beam or ray, through a port in the housing 303, for example, in response to a user input received at the user interface 304.

The HMD 300 may include a housing 310 coupled to a frame 320, with an audio output device 330 including, for example, speakers mounted in headphones, also being coupled to the frame 320. In FIG. 3B, a front portion 310a of the housing 310 is rotated away from a base portion 310b of the housing 310 so that some of the components received in the housing 310 are visible. A display 340 may be mounted on an interior facing side of the front portion 310a of the housing 310. Lenses 350 may be mounted in the housing 310, between the user's eyes and the display 340 when the front portion 310a is in the closed position against the base portion 310b of the housing 310. In some implementations, the HMD 300 may include a sensing system 360 including various sensors and a control system 370 including a processor 390 and various control system devices to facilitate operation of the HMD 300.

In some implementations, the HMD 300 may include a camera 380 to capture still and moving images. The images captured by the camera 380 may be used to help track a physical position of the user and/or the handheld electronic device 302 in the real world, or physical space relative to the augmented environment, and/or may be displayed to the user on the display 340 in a pass through mode, allowing the user to temporarily leave the augmented environment and return to the physical environment without removing the HMD 300 or otherwise changing the configuration of the HMD 300 to move the housing 310 out of the line of sight of the user.

For example, in some implementations, the sensing system 360 may include an inertial measurement unit (IMU) 362 including various different types of sensors such as, for example, an accelerometer, a gyroscope, a magnetometer, and other such sensors. A position and orientation of the HMD 300 may be detected and tracked based on data provided by the sensors included in the IMU 362. The detected position and orientation of the HMD 300 may allow the system to detect and track the user's head gaze direction and movement.

In some implementations, the HMD 300 may include a gaze tracking device 365 to detect and track an eye gaze of the user. The gaze tracking device 365 may include, for example, an image sensor 365A, or multiple image sensors 365A, to capture images of the user's eyes or a specific portion of the user's eyes, such as, the pupil, to detect and track direction and movement of the user's gaze. In some implementations, the HMD 300 may be configured so that the detected gaze is processed as a user input to be translated into a corresponding interaction in the AR experience.

In some implementations, the HMD 300 includes a portable electronic device, such as a smartphone, that is removably disposed within a chamber of the housing 310. For example, the display 340 and the camera 380 may be provided by the portable electronic device. When the chamber is closed (as shown in FIG. 3A), the display 340 is aligned with the lenses 350 so that a user can view at least a portion of the display 340 (provided by the portable electronic device) through each eye. The camera 380 may align with an aperture in the housing 310 so that the portable electronic device of the HMD 300 can capture images while disposed in the housing 310.

Figure 4:
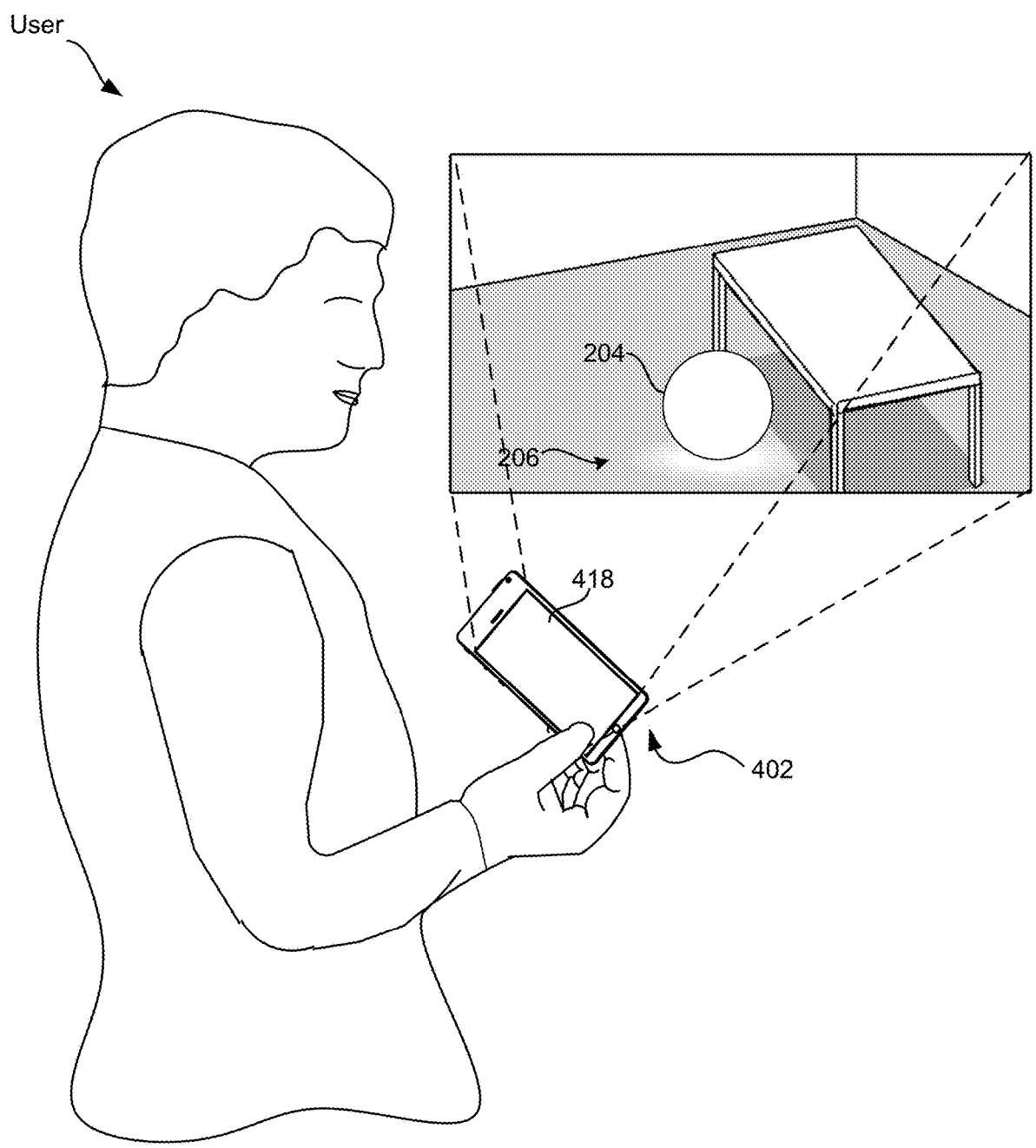
FIG. 4 is a schematic view of a user experiencing the AR environment via an example portable electronic device.

FIG. 4 is a schematic view of a user experiencing the AR environment 202 via an example portable electronic device 402. The portable electronic device 402 is an example of the computing device 102. The portable electronic device 402 may be a smartphone, a tablet, or another type of portable computing device. In this example, the user is experiencing the AR environment through a display device 418 of the portable electronic device. For example, the display device 418 may include a screen that can show images and/or videos captured of the physical space (real-world environment) surrounding the device 402. In this example, content 204 and illumination effect 206 are overlaid on the images shown on the display device 418.

Figure 5:
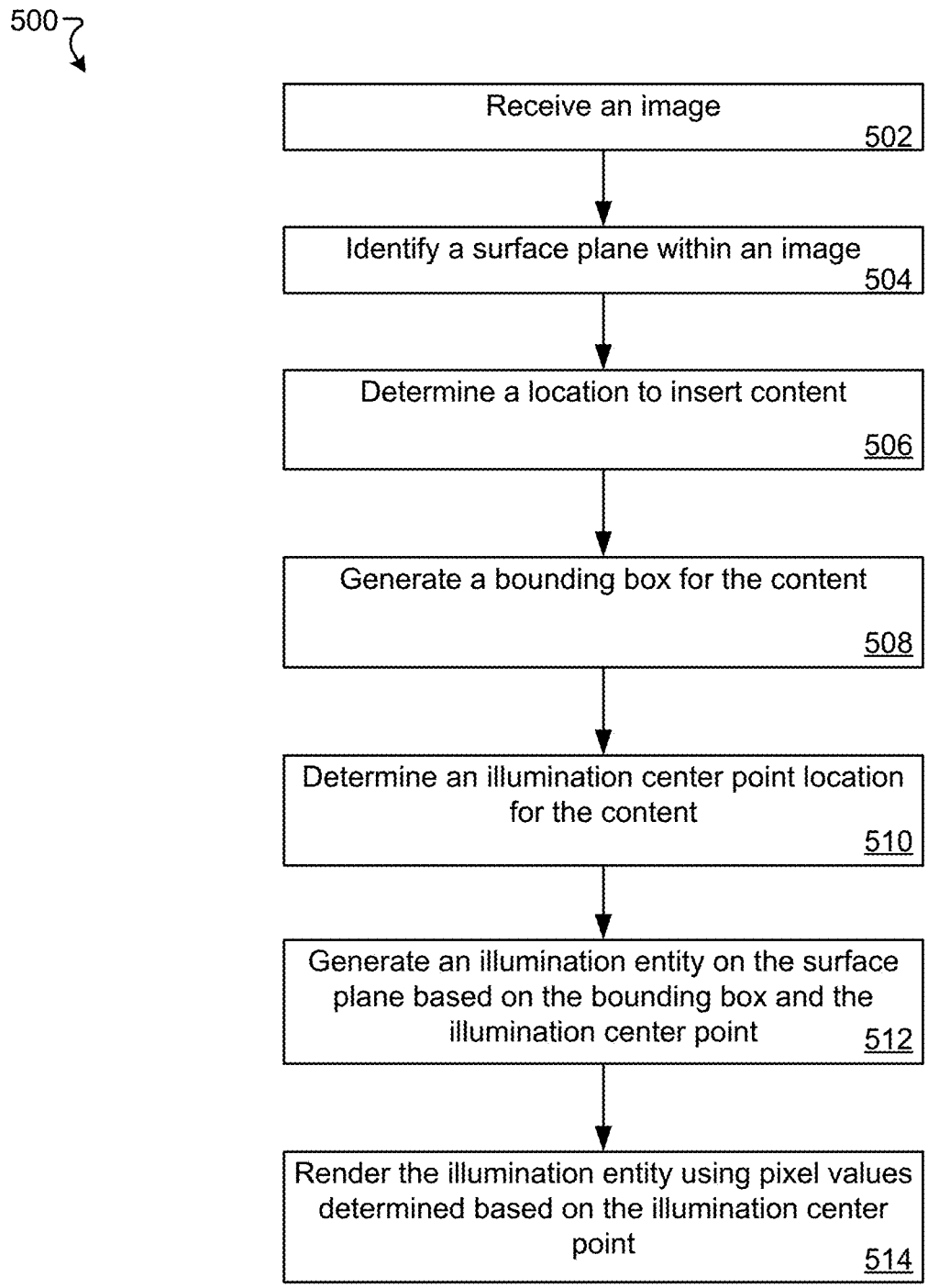
FIG. 5 is a diagram of an example method of generating illumination effects for inserted content, in accordance with implementations described herein.

FIG. 5 is a diagram of an example method 500 of generating illumination effects for inserted content, in accordance with implementations described herein. This method 500 may for example be performed by the computing device 102 to provide an AR environment for a user.

At operation 502, an image is received. Receiving the image may comprise capturing the image with a camera assembly, such as the camera assembly 132. Receiving the image may include accessing a previously captured image that is stored in a memory location. An image may also be received from another computing device, such as a server that is accessible via a network.

At operation 504, a surface plane is identified within the image. The surface plane may be identified using various image processing techniques. For example, the surface plane may be identified by identifying a substantially planar region of the image. In some implementations, the surface plane may be generated based on analyzing multiple images (e.g., a sequence of images from a video stream of the physical space). The surface plane may correspond to the ground, a floor, or another surface upon which objects may be placed (e.g., a table, counter, shelf). In some implementations, multiple surface planes are identified and at least some of the identified surface planes may be walls or other vertically oriented surface planes.

At operation 506, a location of content to be inserted is determined. In some implementations, the content to be inserted is light-distributing AR content. In at least some implementations, the content includes one or more three-dimensional models, such as polygonal meshes. The polygonal mesh may be associated with a skeletal animation model that includes a plurality of skeletal joints that are connected to one another. The skeletal model may allow for movement or rotation around at least some of the joints. These movements may cause corresponding movements or deformations of portions of the polygonal mesh.

The location of the content to be inserted may, for example, be determined by identifying substantially planar surfaces in the received image and positioning the content on (above) an identified surface. The location of the content to be inserted may also be determined at least in part by user input. For example, the user may identify a location within an image to insert content. In some implementations, the content may be placed at a location on a horizontal plane that corresponds to the location identified by the user (e.g., a location below the position identified by the user so the content is positioned on the plane). The location of the content may also be determined based on the location of the content in a previous image (i.e., a previous frame of a video captured by the camera assembly). For example, the content may move around relative to the physical space (e.g., the computer-generated sphere image content shown in FIG. 2 may move across the floor).

At operation 508, a bounding box is generated for the content. In some implementations, the bounding box is generated based on the polygonal mesh. In some implementations, the bounding box is generated based on the joints. The vertices of the polygonal mesh or the joints may be projected from above onto the surface plane identified in operation 504. In some implementations, the vertical component of the 3D positions of the vertices or joints may be ignored to compute the bounding box. In some implementations, the bounding box is a quadrilateral that bounds (surrounds) the projected vertices or joints. The bounding box may be, for example, a rectangle. In some implementations, a subset of the vertices or joints is used to determine the bounding box. For example, the inserted content may be associated with a data structure that identifies some of the vertices or joints to use or exclude from using to generate the bounding box.

At operation 510, an illumination center point location is determined for the content. For example, an illumination center point location may be determined based on the positions of the vertices or joints projected onto the surface plane. In some implementations, the illumination center point is a spatial midpoint of the vertices or the joints. In some implementations, the illumination center point is calculated as a center of mass of the vertices or joints. For example, the vertices or joints may be weighted equally and the location of the center point is determined by averaging the position of the vertices or joints. In some implementations, the vertices or joints are weighted based on distance from the surface plane (e.g., height) and the location of the center point is determined as a weighted average of the positions of the joints. Similar to generating the bounding box (described above at least with respect to operation 508), in some implementations, a subset of the vertices or joints may be used to determine the illumination center point location.

At operation 512, an illumination entity is generated on the surface plane based on the bounding box and the illumination center point. For example, the illumination entity may be a polygon that is circumscribed by the bounding box. In at least some implementations, the illumination entity is an oval-shaped polygon that has a first axis and a second axis that intersect at the illumination center point. The oval-shaped polygon may have zero, one, or two axes of symmetry. In some implementations, polygons having other shapes may be used, such as rectangular polygons. Additionally, as one of skill in the art would understand, an oval-shaped polygon is generally represented using multiple straight lines that are arranged to approximate an oval. In some implementations, the illumination entity may be a region of the image received at operation 502 that is defined based on the bounding box and the illumination center point. In some of these implementations, the pixels of illumination entity are pixels of the underlying image, which may be modified directly.

At operation 514, the illumination entity is rendered using pixel values determined based on the illumination center point. In some implementations, pixels of the illumination entity are rendered based on a tint color associated with the luminous inserted content with varying intensity based on position with respect to the illumination center point. To render the pixels, illumination intensity values may be calculated for each of the pixels. In some implementations, an illumination intensity value is a decimal value between 0 and 1 corresponding to the intensity of the illumination from inserted content on a specific pixel of the illumination entity. For example, illumination intensity values for pixels of the illumination entity may be determined based on the distance between the pixel and the center point. In some implementations, the illumination intensity value for a pixel is also based on the distance from the pixel to the edge of the illumination entity. For example, the illumination intensity value may be determined using a radial fall off function based on the pixel's location represented as a percentage of the distance from the illumination center point to the edge of the illumination entity. In some implementations, a pixel that is on the edge of the illumination entity (100%) will have an illumination intensity value of 0 (i.e., the pixel will not be impacted by the illumination) and a pixel that is at the illumination center point (0%) will have an illumination intensity value of 1 (i.e., the pixel will be fully impacted by the illumination). In some implementations, the radial fall off is linear. In other implementations, the radial fall off is non-linear. For example, for pixels that are less than 50% of the way to the edge of the illumination entity, the illumination intensity value may be high (e.g., close to 1) such that the illumination entity is substantially colored based on the tint of the light from the inserted content; while pixels that are more than 50% of the way to the edge rapidly decrease in illumination intensity value.

In some implementations, the illumination intensity value is modified based on a source scaling factor. As used herein, a source scaling factor is a numeric value that is determined based on properties of the image received at operation 502 at the location corresponding to a pixel of the illumination entity. For example, a source scaling factor may be determined based on the regional brightness of the image. The source scaling factor may be inversely related to the regional brightness of the image (i.e., the brighter the region of the image the smaller the source scaling factor). In some implementations, a spatially or temporally denoised version of the image may be generated for using in determining the source scaling factor. For example, a blur filter may be applied to the image to generate the denoised version of the image. The denoised version of the image is generated using texture level-of-detail biasing in some implementations. The regional brightness value for the illumination intensity value of a pixel in the illumination entity may then be determined based on a luma value of a corresponding pixel in the denoised version of the image. The illumination intensity value may then be scaled based on the luma value. For example, a regional brightness scaling factor may be determined using a clamping function, such as the smoothstep function. As used herein, the smoothstep function is a sigmoid-like interpolation and clamping function. An example, smoothstep function is defined by the following equation:

$$smoothstep(x) = \begin{cases} 0, & \text{if } x \le 0 \\ 3x^2 - 2x^3, & \text{if } 0 < x < 1 \\ 1, & \text{if } x \ge 1 \end{cases}$$

Some implementations use other clamping or interpolation functions. In some implementations, the regional brightness scaling factor (G) for a pixel of the illumination entity is determined using the following equation:

$G=(1-\text{smoothstep}(L))/L;$ where L is a luma value between 0 and 1 of a corresponding pixel of the denoised version of the image.

The scaling factor G may then be used to scale the illumination intensity value. The illumination intensity value may then be applied to a light value associated with the inserted content (e.g., an RGB value) to determine an illumination effect pixel value from the inserted content on the pixel. In some implementations, if multiple inserted contents direct light to the same pixel, the illumination effect pixel values from those inserted contents will be composited. For example, the illumination effect pixel values may be summed to determine a final illumination effect pixel value. If only a single inserted content impacts the pixel, the illumination effect pixel value from that inserted content will also be the final illumination effect pixel value. Then, the final illumination effect pixel values may be applied to the original pixel value from the image (e.g., the image prior to denoising) to arrive at a final illumination entity pixel value. Applying (shading) the final illumination effect pixel value with the original pixel value may include multiplicatively applying the final illumination effect pixel value with the original pixel value. In some implementations, applying the final illumination effect pixel value with the original pixel value includes additively compositing the final illumination effect pixel value with the original pixel value.

In at least some implementations, the final illumination effect pixel value is combined with a color-adjusted original pixel value. The color-adjusted original pixel value may be determined by at least partially desaturating the original pixel value. For example, a luma value may be calculated for the original pixel value and may be combined with the original pixel color using a weighting factor. The weighting factor may be user adjustable. The weighting factor may be specified by a data structure associated with the inserted content. The weighting factor may be determined, at least in part, based on properties of the environment surrounding the user.

Once the illumination entity is rendered, the inserted content can be added in front of the illumination entity and overlaid on the image received at operation 502 to generate an augmented image. The augmented image may then be displayed to the user to provide an augmented environment. Additionally, the rendered illumination entity and the inserted content may be projected onto a transparent combiner surface where they will be shown over a user's field of view of the physical space. Although this example describes adding inserted content in front of the rendered illumination entity, in some implementations the inserted content and the illumination entity are rendered together and only the portions of the illumination entity that would be visible are actually rendered.

Figure 6:
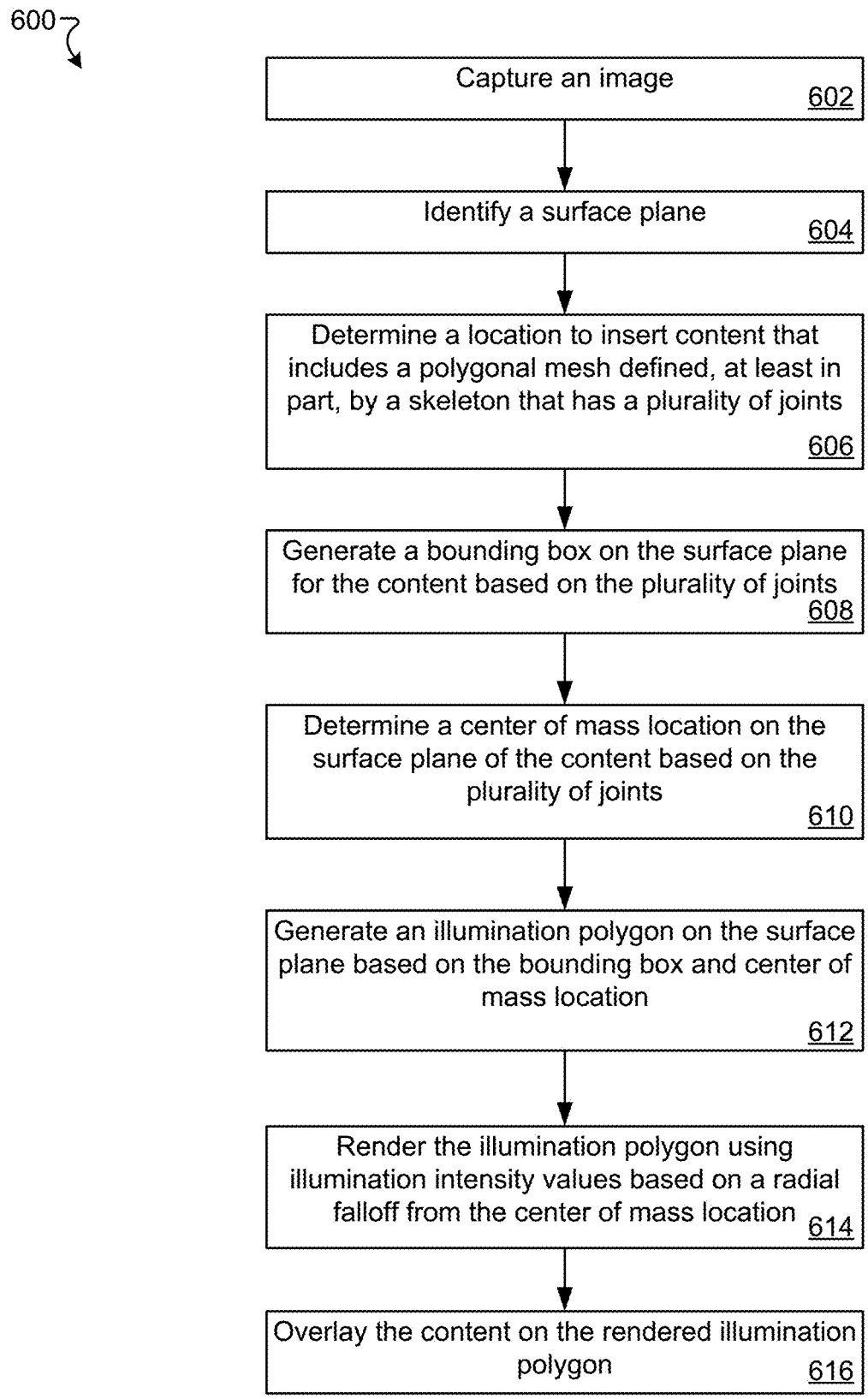
FIG. 6 is a diagram of an example method of generating illumination effects for inserted content, in accordance with implementations described herein.

FIG. 6 is a diagram of an example method 600 of generating illumination effects for inserted content, in accordance with implementations described herein. This method 600 may for example be performed by the computing device 102 to provide an AR environment for a user.

Figure 7A:
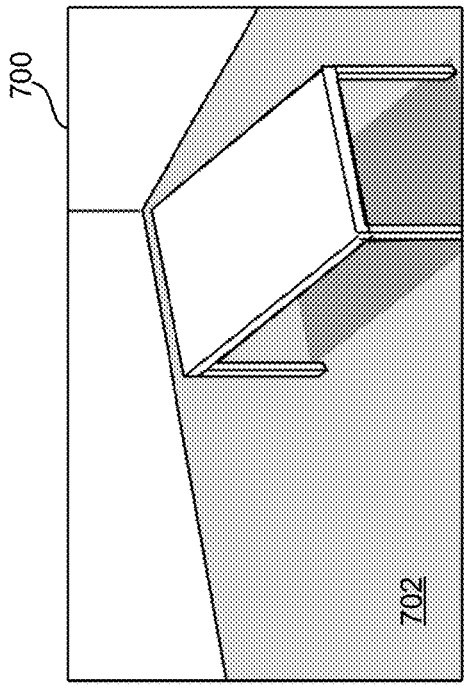
FIGS. 7A-7H are schematic diagrams of steps of generating illumination effects for inserted content in accordance with implementations as described herein.

At operation 602, an image is captured. For example, the image may be captured by a camera assembly of a computing device, such as the computing device 102. The captured image may be stored as a texture in the image buffer 124. An example image 700 is shown in FIG. 7A.

At operation 604, a surface plane is identified in the image. As described above, the surface plane may correspond to the ground or a floor in the image. An example surface plane 702 that has been identified in the image 700 is shown in FIG. 7A.

Figure 7B:
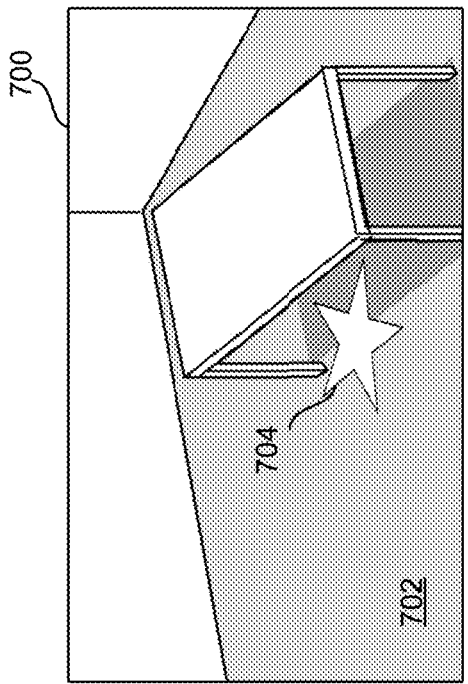
Figure 7C:
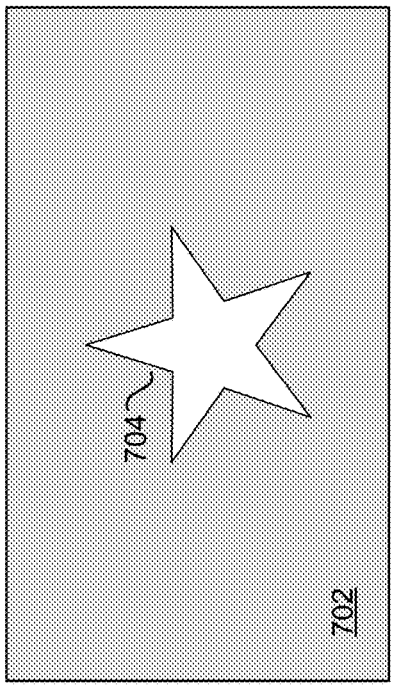
Figure 7D:
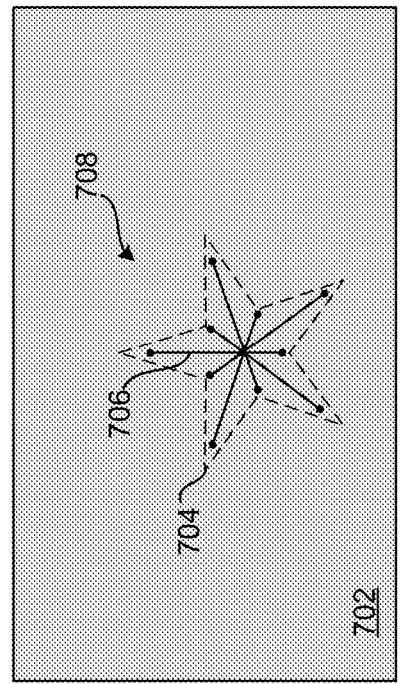

At operation 606, a location is determined for content that will be inserted. In some implementations, the content includes a polygonal mesh that is defined, at least in part, by a skeleton that has a plurality of joints. As described above, the location may be determined in various ways, such as based on user input, the location of the surface plane, and/or a location of the content in a previous image. FIG. 7B shows an example of content 704 at an example determined location overlaid on the image 700. FIG. 7C shows the content 704 over the surface plane 702 from a top view and FIG. 7D shows the skeleton 706 that includes joints 708.

Figure 7F:
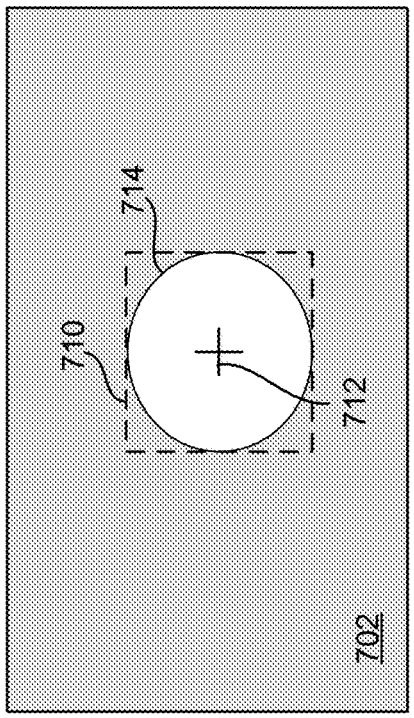
Figure 7E:
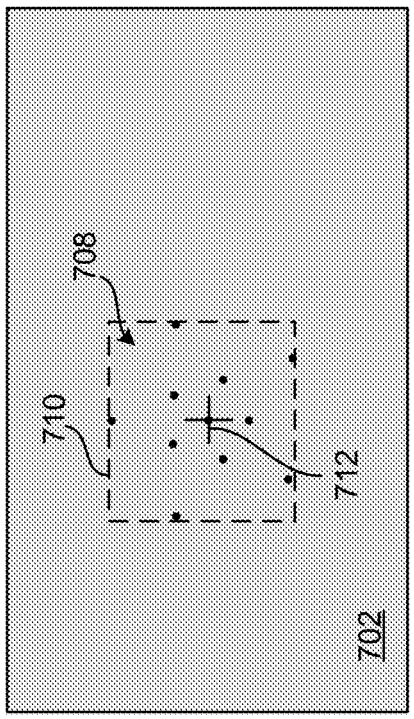

At operation 608, a bounding box is generated on the surface plane for the content based on the plurality of joints. As described above, the bounding box may be a rectangle on the surface plane (e.g., an X-Z plane) that bounds (contains) all or substantially all of the joints. FIG. 7E shows an example bounding box 710 on the surface plane 702 that bounds the joints 708. As noted above, a data structure associated with the inserted content may identify a subset of joints to include or exclude from use in generating the bounding box.

At operation 610, a center of mass location on the surface plane is determined based on the plurality of joints. As described above, the joints may be weighted equally and the center of mass is determined to be the average position of the joints. Alternatively, the joints may be weighted by various factors, such as distance above the surface plane. FIG. 7E shows an example illumination center point 712 on the surface plane 702 that is determined as the center of mass location of the joints 708. In some implementations, a data structure associated with the inserted content may provide weighting values for the joints or may identify a subset of joints to include or exclude from use in determining the center of mass. Although the illumination center point 712 is shown as being in the center of the bounding box 710, this is not always the case. For example, when the inserted content 704 is not symmetric, the illumination center point 712 will likely be offset from the center of the bounding box 710.

At operation 612, an illumination polygon is generated on the surface plane based on the bounding box and the center of mass location. The illumination polygon may have round shape, such as a circle or oval. As described above, the round shape may be sized to fit inside the bounding box and may have a first axis and second axis that intersect at the center of mass location. FIG. 7F shows an example round-shaped illumination polygon 714. In some implementations, the illumination-polygon may be oval or oblong shaped.

Figure 7H:
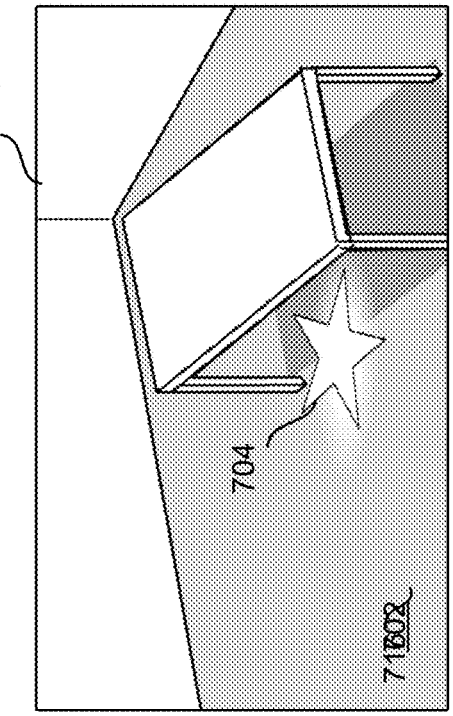
Figure 7G:
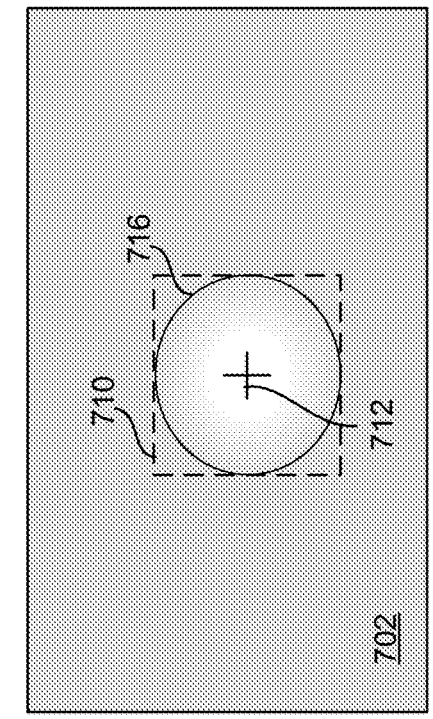

At operation 614, the illumination polygon is rendered using illumination intensity values based on a radial falloff from the center of mass location. As described above, the radial falloff may be linear or non-linear. As also described above, the illumination polygon may be rendered based on regional brightness values of the image (e.g., from a filtered or denoised version of the image) and a color adjusted pixel value from the image (e.g., an at least partially desaturated color value). FIG. 7G shows an example rendered oval-shaped illumination polygon 716.

At operation 616, the content is inserted in front of the rendered illumination polygon. Both the illumination entity and the inserted content can be overlaid on the image captured at operation 602 to generate an augmented image. An example augmented image 750 is shown in FIG. 7H. The augmented image 750 includes the content 704 and the rendered oval-shaped illumination polygon 716 overlaid on the image 700.

Figure 8:
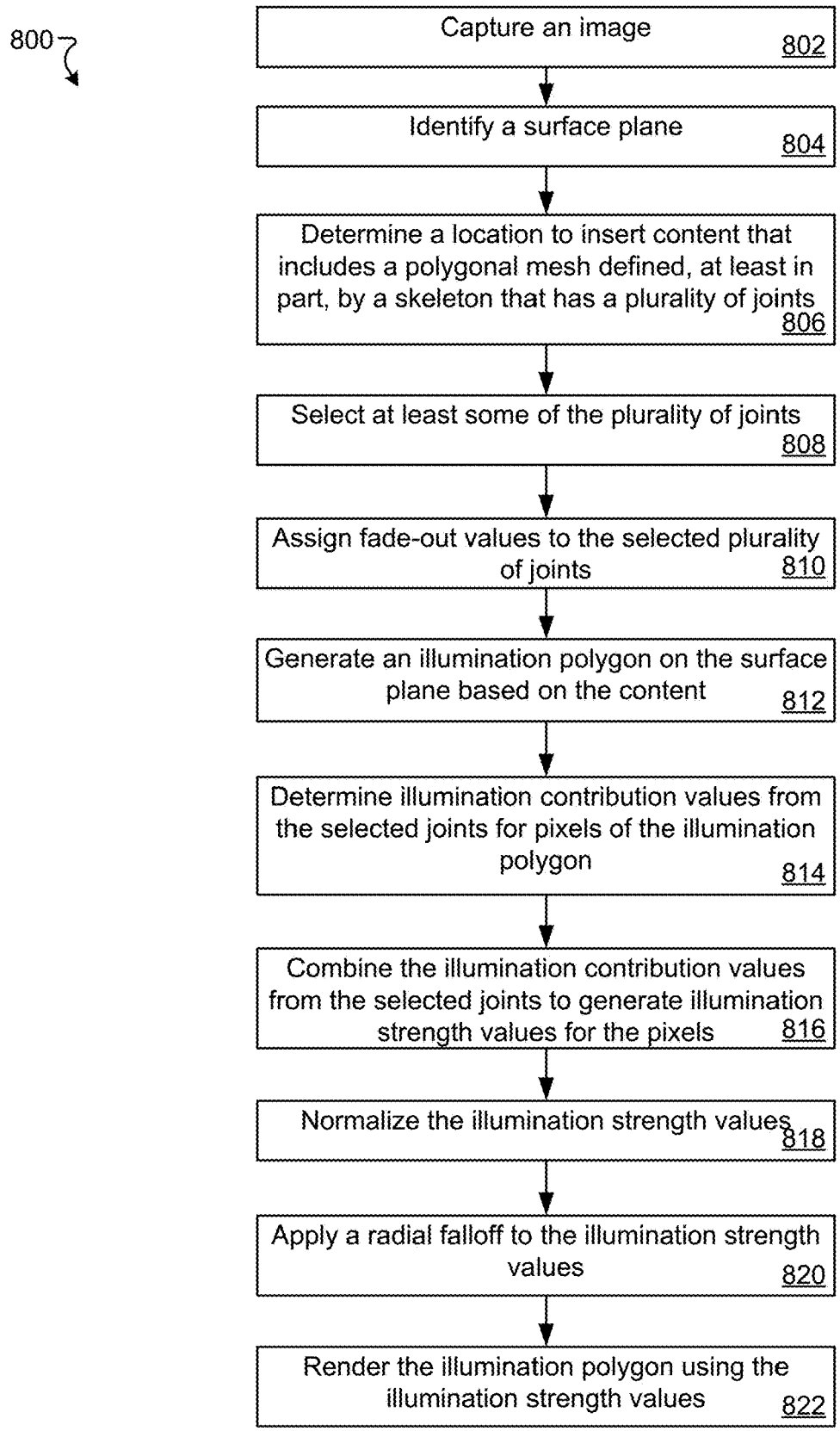
FIG. 8 is a diagram of an example method of generating illumination effects for inserted content, in accordance with implementations described herein.

FIG. 8 is a diagram of an example method 800 of generating illumination effects for inserted content, in accordance with implementations described herein. This method 800 may for example be performed by the computing device 102 to provide an AR environment for a user.

At operation 802, an image is captured. For example, the image may be captured by a camera assembly of a computing device, such as the computing device 102. The captured image may be stored as a texture in the image buffer 124. The example image 700 is shown in FIG. 7A and is used as the basis for the rest of the examples shown in FIGS. 9A-9I.

Figure 9B:
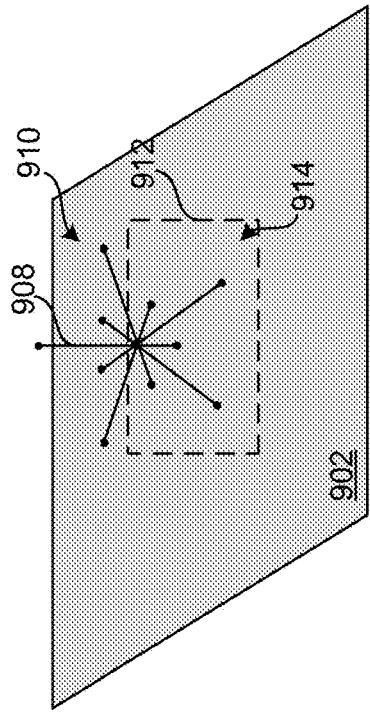
Figure 9D:
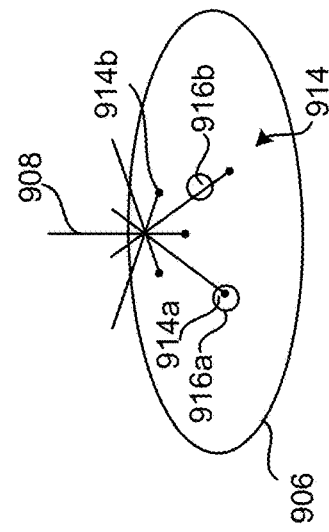
Figure 9A:
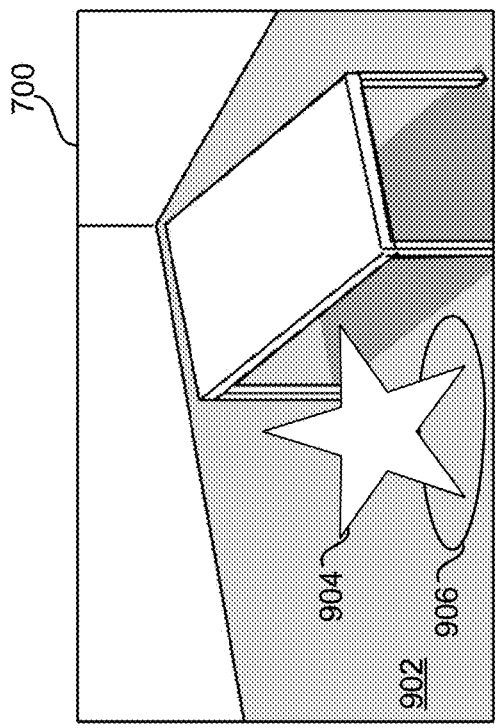

At operation 804, a surface plane is identified in the image. As described above, the surface plane may correspond to the ground or a floor in the image. An example surface plane 902 that has been identified in the image 700 is shown in FIG. 9A.

At operation 806, a location is determined for content that will be inserted. In some implementations, the content includes a polygonal mesh that is defined, at least in part, by a skeleton that has a plurality of joints. As described above, the location may be determined in various ways, such as based on user input, the location of the surface plane, and/or a location of the content in a previous image. FIG. 9A shows an example of the content 904 at an example determined location overlaid on the image 700 (the image 700 can be seen without the inserted content at FIG. 7A). Also shown in FIG. 9A is an illumination polygon 906, which is described further with respect to operation 812. FIG. 9B shows a skeleton 908 associated with the content 904. The skeleton 908 includes joints 910.

At operation 808, at least some joints of the plurality of joints are selected to generate a plurality of selected joints. FIG. 9B shows a region 912 identifying the plurality of selected joints 914. In this example, the joints are being selected based on distance to the surface plane 902. In some implementations, the joints are selected based on a data structure associated with the inserted content. For example, the data structure may identify some joints that should or should not be selected (e.g., to exclude these joints from contributing to illumination effects).

Figure 9C:
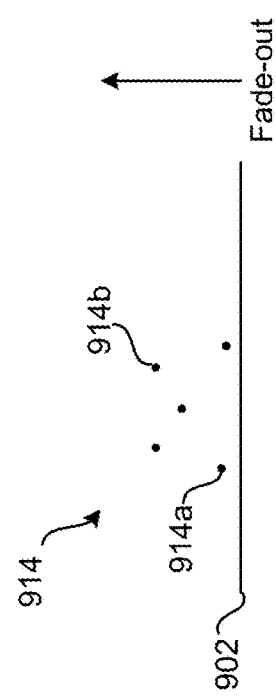

At operation 810, fade-out values are assigned to the selected plurality of joints. The fade-out values may be based on distance from the surface plane 902. FIG. 9C shows a side view of the selected plurality of joints 914 in relation to the surface plane 902. As shown, the fade-out value increases as distance from the surface plane 902 increases.

At operation 812, an illumination polygon is generated on the surface plane based on the content. The illumination polygon may be generated in many ways. For example, the illumination polygon may be rectangular and sized based on a bounding box of the full plurality of joints of the skeletal model. The illumination polygon may also have a more rounded shape formed from, for example, sixteen sides arranged to form a closed oval-like shape. An example illumination polygon 906 is shown in FIG. 9A below the content 904.

At operation 814, illumination contribution values from the selected joints for pixels of the illumination polygon are determined. In some implementations, illumination contribution values are calculated for each of the selected joints for each of the pixels. As described previously, the illumination contribution value for a specific selected joint with respect to a specific pixel can be based on a variety of factors, such as the fade-out value for the specific selected joint, a distance from the specific selected joint to a specific pixel, and an overhead angle of the specific selected joint with respect to the selected pixel. FIG. 9D shows example pixels 916a and 916b from the illumination polygon 906. Also shown in FIG. 9D are selected joints 914a and 914b from the plurality of selected joints 914.

FIG. 9E shows a schematic example of the distance values and overhead angles for the pixel 916a with respect to the selected joints 914a and 914b. In this example, the length of the line 918aa corresponds to the distance from the pixel 916a to the selected joint 914a, and the length of the line 918ab corresponds to the distance from the pixel 916a to the selected joint 914b. Also shown in this example is, an overhead angle $\Theta_{aa}$ between the normal N of the illumination polygon 906 and the line 918aa (between the pixel 916a and the selected joint 914b), and an overhead angle $\Theta_{ab}$ between the normal N and the line 918ab (between the pixel 916a and the selected joint 914b).

Similarly, FIG. 9F shows a schematic example of the distance values and overhead angles for the pixel 916b with respect to the selected joints 914a and 914b. In this example, the length of the line 918ba corresponds to the distance from the pixel 916b to the selected joint 914a, and the length of the line 918bb corresponds to the distance from the pixel 916b to the selected joint 914b. Also shown in this example is, an overhead angle $\Theta_{ba}$ between the normal N of the illumination polygon 906 and the line 918ba (between the pixel 916b and the selected joint 914a), and an overhead angle $\theta_{bb}$ between the normal N and the line 918bb (between the pixel 916b and the selected joint 914b).

In some implementations, the illumination contribution value for a specific selected joint with respect to a specific selected pixel is based on a combination, such as a sum, of a value based on the distance (e.g., the inverse of the distance, a solid angle calculation, or an approximation of a solid angle calculation as described above) and a value based on the overhead angle (e.g., a cosine value of the overhead angle, which in some implementations is scaled by the fade-out value for the specific selected joint).

Although the examples of FIGS. 9D-9E relate to illumination contributions values between two pixels on the polygon 906 and two of the selected joints 914, this is just to clarify the drawings. As noted above, in at least some implementations, illumination contribution values are determined between each of the pixels of the polygon 906 and each of the selected joints. In some implementations, a shader in a rendering pipeline of a GPU may perform at least some of the calculations required to determine the illumination contribution values.

At operation 816, the illumination contribution values from the selected joints are combined to generate composite illumination values for the pixels. Each of these illumination contributions values may be associated with illumination properties for the joint (e.g., a tint and intensity value). The illumination contribution values may then be used to scale the illumination properties of the respective joints. The illumination contributions values may then be combined in various ways. For example, the illumination contributions values may be combined by summing the illumination contribution values for a specific pixel from each of the selected joints for that specific pixel. FIG. 9G shows an example of the polygon 906 with the pixels 916*a* and 916*b* shaded based on example composite illumination values.

At operation 818, the composite illumination values are normalized. For example, the composite illumination values may be normalized to a desired illumination profile using a gamma function. The gamma function may map the composite illumination values determined at operation 816 to a distribution that emphasizes mid-tone illumination effects and reduces bright illumination effects.

At operation 820, a radial falloff is applied to the normalized composite illumination values to generate adjusted composite illumination values. The radial falloff applied to the normalized composite illumination values may be linear or non-linear. The radial falloff may cause the illumination intensity to be reduced at the edges of the illumination polygon. FIG. 9H shows an example rendered illumination polygon 930 that is based on applying the adjusted composite illumination values to the illumination polygon 906.

At operation 822, the illumination polygon may be rendered using the composite illumination values. Similar to as described above, the composite illumination values for a specific pixel may also be adjusted based on regional brightness values of the image (e.g., from a filtered or denoised version of the image) and a color adjusted pixel value from the image (e.g., an at least partially desaturated color value). Then, both the illumination entity and the inserted content can be overlaid on the image captured at operation 802 to generate an augmented image. An example augmented image 950 is shown in FIG. 9I. The augmented image 950 includes the content 904 and the rendered illumination polygon 930 overlaid on the image 700. As shown in the example in FIG. 9I, the rendered illumination polygon 930 includes brighter illumination regions based on proximity to the selected illumination joints.

As described previously, the method 800 for generating illumination effects can be combined with the method 500 or method 600 described in FIGS. 5 and 6, respectively. For example, the rendered illumination polygon 930 can be combined with the rendered oval-shaped illumination polygon 716 (from FIG. 7G) to generate a combined illumination polygon.

Figure 10:
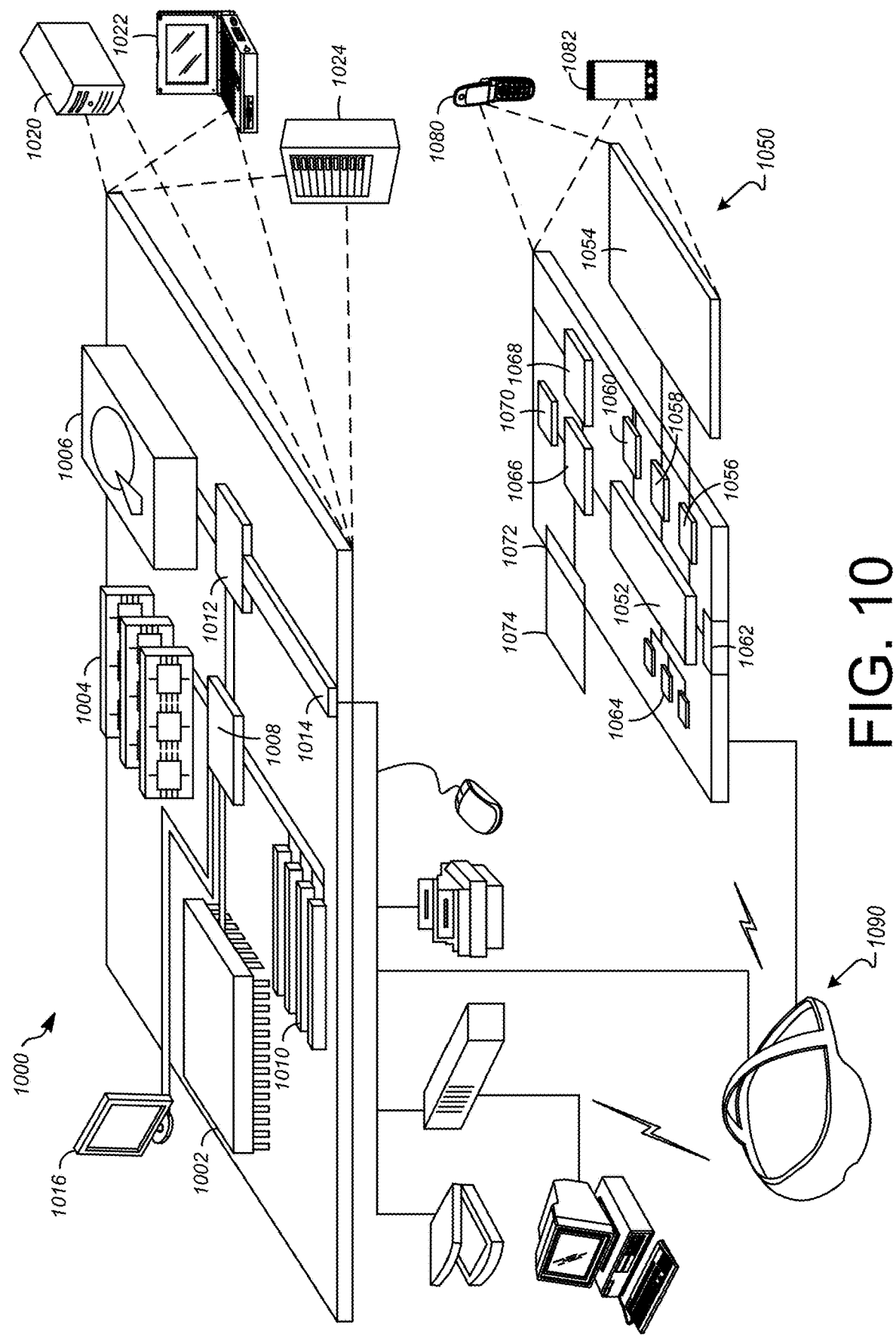
FIG. 10 shows an example of a computer device and a mobile computer device that can be used to implement the techniques described herein.

FIG. 10 shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may include appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In-Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (an LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with an AR headset/HMD device 1090 to generate an augmented environment for viewing inserted content within the physical space. For example, one or more sensors included on a computing device 1050 or other computing device depicted in FIG. 10, can provide input to the AR headset 1090 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the AR space that can then be used as input to the AR space. For example, the computing device 1050 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the AR space can cause a particular action to occur in the AR space.

In some implementations, a touchscreen of the computing device 1050 can be rendered as a touchpad in AR space. A user can interact with the touchscreen of the computing device 1050. The interactions are rendered, in AR headset 1090 for example, as movements on the rendered touchpad in the AR space. The rendered movements can control virtual objects in the AR space.

In some implementations, one or more output devices included on the computing device 1050 can provide output and/or feedback to a user of the AR headset 1090 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the AR space. In the example of the laser pointer in an AR space, the computing device 1050 appears as a virtual laser pointer in the computer-generated, 3D environment. As the user manipulates the computing device 1050, the user in the AR space sees movement of the laser pointer. The user receives feedback from interactions with the computing device 1050 in the AR environment on the computing device 1050 or on the AR headset 1090.

In some implementations, a computing device 1050 may include a touchscreen. For example, a user can interact with the touchscreen in a particular manner that can mimic what happens on the touchscreen with what happens in the AR space. For example, a user may use a pinching-type motion to zoom content displayed on the touchscreen. This pinching-type motion on the touchscreen can cause information provided in the AR space to be zoomed. In another example, the computing device may be rendered as a virtual book in a computer-generated, 3D environment. In the AR space, the pages of the book can be displayed in the AR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR space to control objects in the AR space.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
   determining a location within an image to insert content, wherein the content includes luminous content, the luminous content including a three-dimensional model;
   generating a bounding box on a surface plane for the luminous content based on the three-dimensional model;
   determining an illumination center point location on the surface plane based on the luminous content;
   generating an illumination entity based on the bounding box and the illumination center point location, wherein the illumination entity visually represents light emitted by the luminous content;
   rendering the illumination entity using illumination values for pixels of the illumination entity determined at least in part based on distance of the pixels from the illumination center point location;
   overlaying the luminous content over the rendered illumination entity;
   inserting both the luminous content and the rendered illumination entity into the image to generate an augmented image; and
   causing the augmented image to be displayed.

2. The method of claim 1, wherein the three-dimensional model includes a skeletal animation model having a plurality of skeletal joints.

3. The method of claim 2, wherein the generating a bounding box on the surface plane for the luminous content includes generating the bounding box based on the plurality of skeletal joints.

4. The method of claim 2, wherein the determining an illumination center point location on the surface plane includes determining the illumination center point location based on the plurality of skeletal joints.

5. The method of claim 1, wherein the determining illumination values includes calculating illumination values for the pixels using a non-linear radial falloff based on distance from the illumination center point location.

6. The method of claim 1, wherein the rendering the illumination entity further includes:
   determining regional brightness values for the pixels based on the image; and
   inversely scaling the illumination values for the pixels based on the regional brightness values.

7. The method of claim 1, wherein the rendering the illumination entity includes:
   multiplying the illumination values with pixel values from the image.

8. The method of claim 1, wherein the rendering the illumination entity further includes:
   determining color adjusted-pixel values for pixels from the image; and
   combining the illumination values with the color-adjusted pixel values.

9. The method of claim 8, wherein the determining color-adjusted pixel values from the images includes:
   determining luma values for the pixels from the image; and
   calculating the color-adjusted pixel values based on a weighted average of the luma values for the pixel values and original pixel values of the pixels from the image.

10. A non-transitory computer-readable storage medium comprising instructions stored thereon that, when executed by at least one processor, are configured to cause a computing system to at least:
    determine a location within an image to insert content, wherein the content includes luminous content, the luminous content including a three-dimensional skeletal animation model;
    identify a surface plane based on the image;
    generate a bounding box on the surface plane based on a plurality of skeletal joints from the three-dimensional skeletal animation model;
    determine an illumination center point location on the surface plane based on the plurality of skeletal joints;
    generate an illumination entity based on the bounding box and the illumination center point location, wherein the illumination entity visually represents light emitted by the luminous content;
    render the illumination entity using pixel values determined at least in part based on the illumination center point location;
    overlay the luminous content over the rendered illumination entity;
    insert both the luminous content and the rendered illumination entity into the image to generate an augmented image; and
    cause the augmented image to be displayed.

11. The non-transitory computer-readable storage medium of claim 10, wherein the instructions that cause the system to determine the location within the image to insert content include instructions that cause the system to receive a user input identifying a location for the content.

12. The non-transitory computer-readable storage medium of claim 10, wherein the instructions that cause the system to determine the illumination center point location include instructions that cause the system to:
    project the plurality of skeletal joints onto the surface plane; and
    determine the illumination center point based on calculating a midpoint of the projected plurality of skeletal joints.

13. The non-transitory computer-readable storage medium of claim 10, wherein the instructions that cause the system to determine the illumination center point location include instructions that cause the system to:
    project the plurality of skeletal joints onto the surface plane; and
    determine the illumination center point based on calculating a center of mass of the plurality of skeletal joints.

14. The non-transitory computer-readable storage medium of claim 10, wherein the content further includes a polygonal mesh surrounding the plurality of skeletal joints.

15. A system comprising:
    a camera assembly;
    at least one processor; and
    memory storing instructions that, when executed by the at least one processor, cause the system to:
    capture an image with the camera assembly;
    identify a surface plane based on the image;
    determine a location to insert first content that includes a three-dimensional polygonal mesh defined in part by a skeleton that has a plurality of skeletal joints, wherein the first content includes luminous content;

generate a bounding box on the surface plane for the first luminous content based on the plurality of skeletal joints;
determine a center of mass location of the first luminous content based on projecting the plurality of skeletal joints on the surface plane;
generate a first illumination entity on the surface plane based on the bounding box and the center of mass location, wherein the first illumination entity visually represents light emitted by the first luminous content;
render the first illumination entity using illumination values that are based on applying a radial falloff function to the center of mass location;
overlay the first luminous content over the rendered first illumination entity;
insert both the first luminous content and the rendered first illumination entity into the image to generate an augmented image; and
cause the augmented image to be displayed.

16. The system of claim 15, wherein the memory further stores instructions that, when executed by the at least one processor, cause the system to:
determine a second location to insert second luminous content;
generate a second illumination entity on the surface plane based on the second luminous content, wherein the first illumination entity and the second illumination entity overlap; and
additively composite the first illumination entity and the second illumination entity.

17. The system of claim 15, wherein the memory further stores instructions that, when executed by the at least one processor, cause the system to generate the second illumination entity behind the second luminous content.

* * * * *